United States Patent
Huttunen et al.

(10) Patent No.: US 8,520,703 B2
(45) Date of Patent: Aug. 27, 2013

(54) ENHANCED ELECTRONIC SERVICE GUIDE CONTAINER

(75) Inventors: Juhani Huttunen, Veikkola (FI); Martin Jansky, Espoo (FI); Toni Paila, Degerby (FI); Topi Pohjolainen, Helsinki (FI); Jani Poikela, Helsinki (FI)

(73) Assignee: Nokia Corporation, Espoo (FI)

( * ) Notice: Subject to any disclaimer, the term of this patent is extended or adjusted under 35 U.S.C. 154(b) by 1835 days.

(21) Appl. No.: 11/208,097

(22) Filed: Aug. 19, 2005

(65) Prior Publication Data

US 2006/0225093 A1   Oct. 5, 2006

Related U.S. Application Data

(60) Provisional application No. 60/668,283, filed on Apr. 5, 2005.

(51) Int. Cl.
  *H04J 3/24*   (2006.01)

(52) U.S. Cl.
  USPC .......................................................... 370/473

(58) Field of Classification Search
  USPC ........................... 370/470, 471, 473, 475, 477
  See application file for complete search history.

(56) References Cited

U.S. PATENT DOCUMENTS

| | | | |
|---|---|---|---|
| 5,440,545 A * | 8/1995 | Buchholz et al. | 370/426 |
| 6,028,599 A | 2/2000 | Yuen et al. | |
| 6,442,755 B1 | 8/2002 | Lemmons et al. | |
| 6,536,041 B1 | 3/2003 | Knudson et al. | |
| 6,754,906 B1 * | 6/2004 | Finseth et al. | 725/45 |
| 6,925,650 B1 * | 8/2005 | Arsenault et al. | 725/39 |
| 7,428,553 B2 * | 9/2008 | Shin | 1/1 |

(Continued)

FOREIGN PATENT DOCUMENTS

| | | |
|---|---|---|
| EP | 1 383 326 A2 | 1/2004 |
| FR | 2 797 548 A1 | 2/2001 |

(Continued)

OTHER PUBLICATIONS

Service Guide for Mobile Broadcast Services, Draft Version 1.0—Feb. 15, 2006, Open Mobile Alliance, OMA-TS-BCAST_ServiceGuide-V1_0_0-20060215-D, ww.oma.org, Chapters 5.5-5.5.5.2, pp. 59-76.

Service Guide for Mobile Broadcast Services, Draft Version 1.0—Feb. 4, 2005, Open Mobile Alliance, OMA-TS-BCAST_ServiceGuide-V1_0_0-20050204-D, www.oma.org, Chapters 5.4-5.4.3, pp. 1-17.

(Continued)

*Primary Examiner* — Mark Rinehart
*Assistant Examiner* — Mohammad Anwar
(74) *Attorney, Agent, or Firm* — Ditthavong Mori & Steiner P.C.

(57) ABSTRACT

An aspect of the invention provides an efficient transportation of ESG fragments to a receiver through the formation of containers. A container comprises at least one ESG fragment, but may contain a plurality of fragments. A fragment may be also carried by more than one container. Aspects of the present invention utilize a simple and extensible header structure apart from the fragments and independent of the type and format of the individual fragments. In an aspect of the present invention, compression is applied over the entire container, including the fragments and any headers. In an aspect of the present invention, a 3GPP metadata envelope is carried within the container without the need for unnecessary repetition of parameters, such as for example, version, validity time, and identification. In an aspect of the present invention, a simplified container system allows for the updating of previously received fragments.

23 Claims, 20 Drawing Sheets

(56) References Cited

U.S. PATENT DOCUMENTS

| | | | |
|---|---|---|---|
| 7,480,245 B2 * | 1/2009 | Russell | 370/235 |
| 2002/0059584 A1 * | 5/2002 | Ferman et al. | 725/34 |
| 2003/0001901 A1 * | 1/2003 | Crinon et al. | 345/810 |
| 2005/0193408 A1 * | 9/2005 | Sull et al. | 725/32 |
| 2006/0015568 A1 * | 1/2006 | Walsh et al. | 709/217 |
| 2006/0015816 A1 * | 1/2006 | Kuehner et al. | 715/744 |
| 2006/0053450 A1 * | 3/2006 | Saarikivi et al. | 725/46 |
| 2006/0062059 A1 * | 3/2006 | Smith et al. | 365/199 |

FOREIGN PATENT DOCUMENTS

| | | |
|---|---|---|
| WO | WO 92/06438 | 4/1992 |
| WO | WO 96/34486 | 10/1996 |
| WO | WO 96/41470 | 12/1996 |
| WO | WO 96/41472 | 12/1996 |
| WO | WO 99/65242 | 12/1999 |
| WO | WO01/01678 A1 | 1/2001 |
| WO | WO 03/032148 | 4/2003 |
| WO | WO 03/034735 | 4/2003 |
| WO | WO 2004/015917 A1 | 2/2004 |
| WO | WO 2004/056096 A1 | 7/2004 |

OTHER PUBLICATIONS

Service Guide for Mobile Broadcast Services, Draft Version 1.0—Aug. 18, 2005, Open Mobile Alliance, Ltd. 2005.

U.S. Appl. No. 10/917,700, Aug. 13, 2004, Grant.

Evain, Jean-Pierre et al. TV-Anytime, EBU Technical Review, Jul. 2003, pp. 1-11.

Extended European search report of European Patent Application No. 06710584.1-2202 dated Feb. 23, 2010, pp. 1-7.

Flute for MBMS downloading, Nokia, 3GPP TSG SA4#29 Meeting, Tdoc S4-030772, XP-002365309, Nov. 24-28, pp. 1-10.

Gross, M. et al., Instinct for Convergence, Update on Deliverable 1.1, v. 1.0, XP003011336, Mar. 21, 2005, pp. 1-12.

European Office action for European Patent Application No. 06710584.1-2202 dated Jun. 9, 2010, 1 page.

A lightweight XML Repository Supporting Dynamic Partial Update of XML Data, Shin et al., DASFAA, Lee et al. (Eds.), 2004, LNCS 2973, Springer-Verlag Berlin Heidelberg, pp. 220-225.

European Office action for European Patent Application No. 06 710 584.1-2202 dated Jan. 17, 2011, pp. 1-5.

Indian Office Action for corresponding IN Application No. 4387/CHENP/2007, Jan. 13, 2011, pp. 1-2.

* cited by examiner

◀—500A—▶

| | | |
|---|---|---|
| type | (6 bits) | Type of this entry in Container Header |
| entry_length | (10 bits) | Length of this entry in bytes. Always multiple of 4. |

◀—500B—▶

| | | |
|---|---|---|
| type | (6 bits) | Type 1 is simplest ESG Fragment declaration |
| entry_length | (10 bits) | Length of this entry in bytes. For type 1 the length is always 12. |
| frag_format | (8 bits) | Defines the encoding of the ESG Fragment |
| frag_version | (8 bits) | Version of the ESG Fragement |
| frag_id | (32 bits) | Unique id of the ESG Fragment in its BaseURI |
| | | Globally unique id is BaseURI directly appended with frag_id |
| frag_offset | (32 bits) | Start of ESG Fragment, defined as bytes from the Container payload part. |

◀—500C—▶

| | | |
|---|---|---|
| type | (6 bits) | Type 2 is ESG Fragment declaration that includes BaseURI and validity |
| entry_length | (10 bits) | Length of this entry in bytes. Always multiple of 4. |
| frag_format | (8 bits) | Defines the encoding of the ESG Fragment |
| frag_version | (8 bits) | Version of the ESG Fragment |
| frag_id | (32 bits) | Unique id of the ESG Fragment in its BaseURI |
| | | Globally unique id is BaseURI directly appended with frag_id |
| frag_offset | (32 bits) | Start of ESG Fragment, defined as bytes from the Container payload part. |
| frag_valid_start | (32 bits) | 32 MSB of NTP time denoting the time when the validity of the ESG Fragment starts |
| frag_valid_end | (32 bits) | 32 MSB of NTP time denoting the time when the validity of the ESG Fragment ends |
| BaseURI | (var.) | BaseURI for the ESG Fragment. BaseURI is included as ASCII characters. Length of the BaseURI is is (entry-length-20). If the BaseURI does not align perfectly with the 4 byte rule of the entry, the ascii characters (zeros) are used for padding. |

◀—500D—▶

| | | |
|---|---|---|
| type | (6 bits) | Type 3 is ESG Fragment list |
| entry_length | (10 bits) | Length of this entry in bytes. Always multiple of 4. |
| frag_format | (8 bits) | Defines the encoding of the ESG Fragment |
| frag_version | (8 bits) | Version of the ESG Fragement |
| frag_id | (32 bits) | Unique id of the ESG Fragment in its BaseURI |
| | | Globally unique id is BaseURI directly appended with frag_id |
| frag_offset | (32 bits) | Start of ESG Fragment, defined as bytes from the Container payload part. |
| Note: | | If the fragment list does not align perfectly with 4 byte rule, in the end 16 zero bits shall be used for padding. This is the case when there is even number of |
| ESG | | Fragments in the fragment list |

◀—500E—▶

| | | |
|---|---|---|
| type | (6 bits) | Type 4 is Container-wide definition of BaseURI and validity of ESG Fragments. Note: Individual ESG Fragment declarations of type 2 shall override the definitions given in this entry. |
| entry_length | (10 bits) | Length of this entry in bytes. For type 1 the length is always 12. |
| frag_valid_start | (32 bits) | 32 MSB of NTP time denoting the time when the validity of the ESG Fragment starts |
| frag_valid_end | (32 bits) | 32 MSB of NTP time denoting the time when the validity of the ESG Fragment ends |
| BaseURI | (var.) | BaseURI for the ESG Fragment. BaseURI is included as ASCII characters. Lenght of the BaseURI is is (entry-length-10). If the BaseURI does not align perfectly with the 4 byte rule of the entry, the ascii characters with value zero are used for padding. |

Fig. 5b

XML Schema for ESG Delivery Descriptor

```xml
<?xml version="1.0" encoding="UTF-8"?>
<xs:schema xmlns:xs="http://www.w3.org/2001/XMLSchema"
    elementFormDefault="qualified"
    targetNamespace:xs="http://www.example.com/esgDeliveryDescriptor">
<xs:element name="Session" maxOccurs="unbounded">
  <xs:complexType>
    <xs:sequence>
      <xs:element name="Fragment" maxOccurs="unbounded">
        <xs:complexType>
          <xs:attribute name="type"
              type="xs:anyURI"           // This URI gives the namespace of target fragment. I.e. it identifies the ESG XML Fragment type. Use mime:<type> for non XML.
              use="required"/>
          <xs:attribute name="id"        // The ID of ESG Fragment. (32 bits)
              type="xs:positiveInteger"
              use="required"/>
          <xs:attribute name="version"   // The version of ESG Fragment (32 bits). The value is the NTP timestamp
              type="xs:positiveInteger"
              use="optional"/>
          <xs:attribute name="containerId" // This indicated in which Container ID the Fragement ID is carried.
              type="xs:positiveInteger"
              use="optional"/>
          <xs:attribute name="name"      // This gives the name of the Fragement. Used only with non XML ESG Fragments.
              type="xs:anyURI"
              use="optional"/>
          <xs:anyAttribute processContents="skip"/>
        </xs:complexType>
      </xs:element>
      <xs:attribute name="destIP"        // Destination IP address of target FLUTE/ALC session.
          type="xs:positiveInteger"      // Is there XML-schema type for IP address?
          use="required"/>
      <xs:attribute name="port"          // Port of target FLUTE/ALC session
          type="xs:positiveInteger"
          use="required"/>
      <xs:attribute name="tsi"           // TSI of target FLUTE/ALC session
          type="xs:positiveInteger"
          use="required"/>
      <xs:attribute name="validFrom"     // NTP timestamp. 32 bits.
          type="xs:positiveInteger"
          use="optional"/>
      <xs:attribute name="validTo"       // NTP timestamp. 32 bits.
          type="xs:positiveInteger"
          use="optional"/>
      <xs:anyAttribute processContents="skip"/>  // Allows one to tag the session with any thinkable attribute, for example "genre", or, "channel"
    </xs:complexType>
  </xs:element>
</xs:schema>
```

Fig. 13

Binary version XML Schema for ESG Delivery Descriptor

| Field | Length | Notes |
|---|---|---|
| ESG_Delivery_Descriptor { | | |
| Header { | | |
| reserved | 16 bits | Must be set to 0x00 |
| n_o_URIdefinitions | 16 bits | Number of URI definitions. Each definition is declared : the common header as string and associated with integer that is used in the payload. |
| URIDefinition { | | Repeat n_o_URIdefinitions -times |
| definition_index | 16 bits | The index with which the definition is referred. |
| definition_length | 8 bits | The length of URI definition to follow - in bytes. |
| definition | n bits | n = definition length * 8 |
| } | | |
| } | | |
| Payload { | | |
| reserved | 16 bits | Must be set to 0x00 |
| n_o_sessions | 16 bits | Number of Session elements |
| Session { | | Repeat n_o_sessions -times |
| reserved | 16 bits | Must be set to 0x00 |
| n_o_fragments | 16 bits | Number of Fragments |
| destIP | 128 bits | Same as destIP attribute in Session element in XML |
| port | 32 bits | Same as port attribute in Session element in XML |
| tsi | 32 bits | Same as tsi attribute in Session element in XML |
| Fragment { | | Repeat n_o_fragments -times |
| length | 16 bits | Length of the Fragment fields to follow for this Fragment |
| type | 16 bits | The value must be declared definition_index (see above) |
| id | 32 bits | ID of the ESG Fragment as in Session element in XML. |
| version | 32 bits | Version of the ESG Fragment as in Session element in XML |
| Extension() | n bits | The extension entries are used to fill up the Fragment until the "length" is filled. For example to declare the containerId (as in Session element in XML) or other optional / broadcaster-operator -defined fields |
| } | | |
| } | | |
| } | | |

Fig. 14

Container Syntax

| Field | Type | Notes | |
|---|---|---|---|
| Container { | | | |
|   Header { | | | |
|     reserved | 8 bits | Must be set to 0x00 | |
|     payload_compression | 8 bits | 0x00 = Payload is not compressed<br>0x01 = Payload is compressed wit GZIP algori | |
|     n_o_fragments | 16 bits | Number of ESG fragments contained. | |
|     FragmentEntry { | | Repeat n_o_fragments-times | |
|       fragment_id | 32 bits | Identifier of the fragment | Fragment IDs have been declared in the ESG Delivery Descriptor. The undeclared Fragments may be cached pending for later declaration. |
|       fragment_version | 32 bits | Version of the fragment (NTP timestamp) | Using NTP timestamp as 32 bit version instead of simple incrementing (0, 1, 2, ....) integer as fragment version is one part of the invention |
|       offset | 16 bits | Offset pointer to the start of the fragment i the Payload as number of bytes from the start the Payload. | |
|       fragment_encoding | 16 bits | How is the fragment encoded in the payload.<br>0x0000 = Plain text in UTF-8, referred conte<br>0x0001 = Plain text in UTF-8, self-contained<br>0x0002 = GZIP referred context<br>0x0003 = GZIP self-contained<br>0x0004 = BiMv1 referred context<br>0x0005 = BiMv1 self-contained | |
|     } | See Note | Repeat n_o fragments-times. | |
|   } | | | |
|   Payload { | | | |
|     Fragment() | | | |
|   } | | | |
| } | | | |

Each ESG Fragment (XML Fragment, XML Document or any other file) is included in the payload at the position given by "offset". From all offsets and container length the receiver can easily deduce the position and length of each ESG Fragment.

Each ESG Fragment is encoded with the given "fragment_encoding":
- Referred context means that the fragment in question, is just the plain fragment.
  The context of the fragment (Schema) is given in the ESG Delivery Descriptor
- Self-contained means that the fragment in question can be parsed by the parser as it has been delivered. (I.e. the fragement itself is standalone document).

Fig. 15

ENHANCED ELECTRONIC SERVICE GUIDE CONTAINER

The present application claims priority to U.S. Provisional Application Ser. No. 60/668,283, entitled "ENHANCED ELECTRONIC SERVICE GUIDE CONTAINER" and filed Apr. 5, 2005, which is incorporated by reference in its entirety herein.

FIELD OF THE INVENTION

The invention relates generally to communications networks. More specifically, the invention relates to the signaling of an aggregate of data within a broadcast system.

BACKGROUND OF THE INVENTION

Generally, an Electronic Service Guide (ESG) enables a terminal to communicate what services are available to end users and how the services may be accessed. ESG fragments are independently existing pieces of the ESG. Traditionally, ESG fragments comprise Extensible Markup Language (XML) documents or fragments of XML documents, but more recently they have encompassed a vast array of items, such as for example, a Session Description Protocol (SDP) description, a textual file, or an image. The ESG fragments describe one or several aspects of a service or broadcast program, available currently or in the future. Such aspects may include for example: free text description, schedule, geographical availability, price, purchase method, genre, and supplementary information such as preview images or clips. Audio, video and other types of data comprising the ESG fragments may be transmitted through a variety of types of networks according to many different protocols. For example, data can be transmitted through a collection of networks usually referred to as the "Internet" using protocols of the Internet protocol suite, such as Internet Protocol (IP) and User Datagram Protocol (UDP). Data is often transmitted through the Internet addressed to a single user. It can, however, be addressed to a group of users, commonly known as multicasting. In the case in which the data is addressed to all users it is called broadcasting.

One way of broadcasting data is to use an IP data casting (IPDC) network. IPDC is a combination of digital broadband broadcast and Internet Protocol. Through such an IP-based broadcasting network, one or more service providers can supply different types of IP services including on-line newspapers, radio, and television. These IP services are organized into one or more media streams in the form of audio, video and/or other types of data. To determine when and where these streams occur, users refer to an ESG. One example used in Digital Video Broadcasting (DVB) streams is an electronic program guide (EPG). One type of DVB is Digital Video Broadcasting-Handheld (DVB-H), a recently developed technology that increases the capabilities and services available on small handheld devices, such as mobile telephones. The DVB-H is designed to deliver data to a battery-powered terminal device.

The present invention, however, is also is applicable to other traditional digital mobile broadcast systems such as, for example, Terrestrial Digital Audio Broadcasting (T-DAB), Terrestrial/Satellite Digital Media Broadcasting (T/S-DMB), Integrated Services Digital Broadcasting—Terrestrial (ISDB-T), and Advanced Television Systems Committee (ATSC), proprietary systems such as Qualcomm MediaFLO/FLO, and non-traditional systems such 3rd Generation Partnership Project Multimedia Broadcast/Multicast Services (3GPP MBMS) and 3rd Generation Partnership Project 2 Broadcast/Multicast Service (3GPP2 BCMCS).

As images and other large files predominate the ESG transport, a need exists to efficiently transport the ESG fragments across the desired networks to the end receivers. Previous systems transmitted a header before the ESG, however, this is quite inefficient because if containers carrying ESGs are transmitted before the header, the information is inaccessible until the header arrives and there is the risk of not receiving the header, thereby rendering the information in the container useless. Current attempts focus on associating several fragments together; however, these attempts have been largely unsuccessful due to the lack of unique identification of the fragments, an efficient header or indexing structure, or requiring the presence of repetitive parameters. There is also a need in the art for ESGs to be visible to the end user as soon as possible.

BRIEF SUMMARY OF THE INVENTION

Aspects of the present invention allow for the efficient transportation of ESG fragments to a receiver through the formation of containers. In this sense, a container comprises at least one ESG fragment, but may contain a plurality of fragments. Alternatively, a fragment may be carried in more than one container. The containers are transported to the receiver, for example, by using Asynchronous Layer Coding (ALC)/Layered Coding Transport (LCT) such that a single ALC/LCT transport object corresponds to a single container. The fragments can be utilized by the receiver upon reception of the entire container. An aspect of the present invention utilizes a simple and extensible header structure apart from the fragments independent of the type and format of the individual fragments. In further embodiments, compression is applied over the entire container, including the fragments and any headers. In yet further embodiments, other envelopes, e.g. a 3rd Generation Partnership Project (3GPP) metadata envelope may be carried within the container without the need for unnecessary repetition of parameters, such as for example, version, validity time, and identification.

Metadata within the 3GPP envelope or in any other form may include specific channels, specific programs, and/or specific channel bundles. Other types of metadata may include: package data, purchase data, such as operator identity data and technical data for performing the transaction, e.g., an address, protocol, price data which may be based upon package/day, channel/minute, program/minute; channel data, such as a textual description for a user, content provider branding information/logo, classification and rating data, such as genre and parental rating, channel SDP data, such as a description of capabilities needed to use the service, e.g., audio and video format and bit rate information, start and end time, addresses, addresses of synchronized auxiliary data feeds, proprietary extensions; and program data, such as a textual description for a user, start and end times, references for interactive services related to the program. This metadata may be loaded by an operator or may be performed automatically.

In certain embodiments, the present invention can be partially or wholly implemented on a computer-readable medium, for example, by storing computer-executable instructions or modules, or by utilizing computer-readable data structures.

Of course, the methods and systems of the above-referenced embodiments may also include other additional elements, steps, computer-executable instructions, or computer-readable data structures. In this regard, other embodiments are disclosed herein as well.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIGS. 5a and 5b illustrate a block diagram of an exemplary electronic service guide (ESG) fragment descriptor entries in accordance with at least one aspect of the present invention.

FIG. 13 illustrates an ESG delivery solution in accordance with an aspect of the present invention.

FIG. 14 illustrates an ESG delivery solution in accordance with an aspect of the present invention.

FIG. 15 illustrates an ESG delivery solution in accordance with an aspect of the present invention.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

It is noted that various connections are set forth between elements in the following description. It is noted that these connections in general and, unless specified otherwise, may be direct or indirect and that this specification is not intended to be limiting in this respect.

Figure 1:
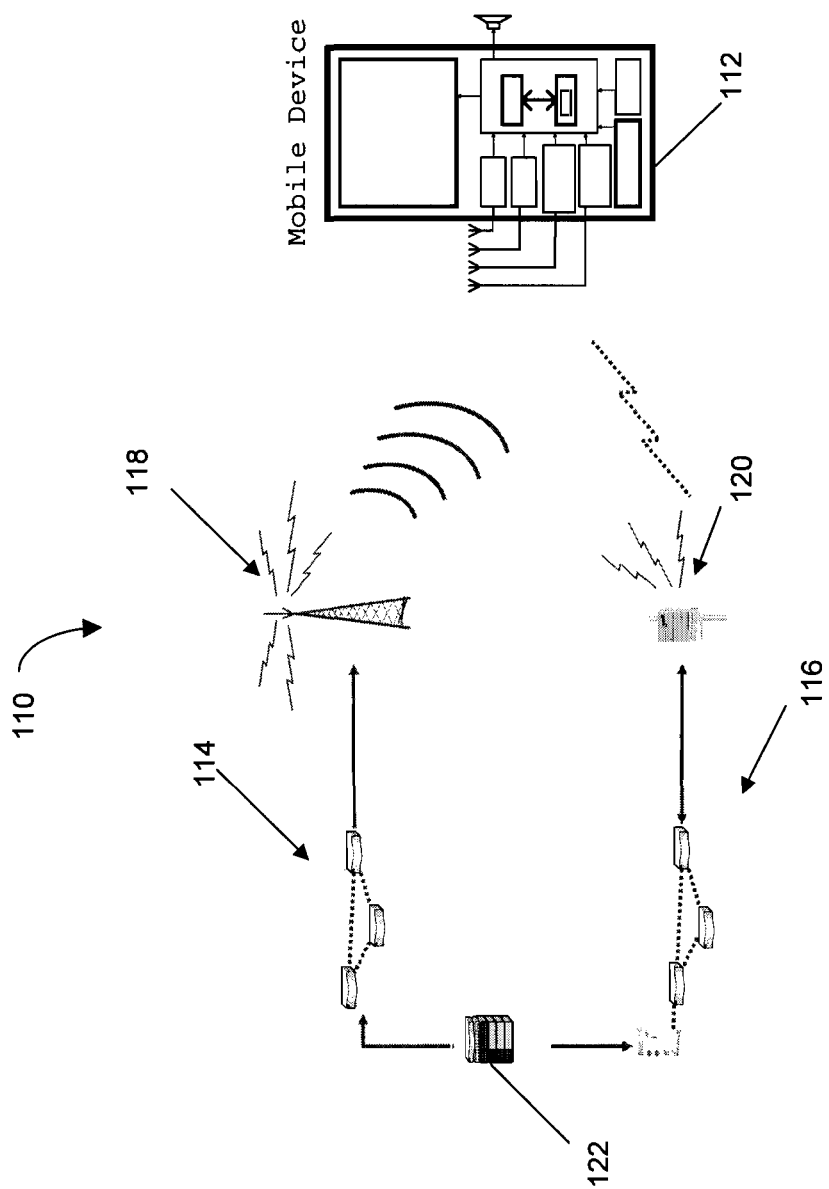
FIG. 1 illustrates a schematic of a wireless communication system in which various aspects of the present invention may be implemented.

The present invention may be utilized across a broad array of networks and communication protocols. FIG. 1 illustrates an example of a wireless communication system 110 in which the systems and methods of the invention may be employed. One or more network-enabled mobile devices 112, such as a personal digital assistant (PDA), cellular telephone, mobile terminal, personal video recorder, portable television, personal computer, digital camera, digital camcorder, portable audio device, portable radio, or combinations thereof, are in communication with a service source 122 through a broadcast network 114 and/or cellular network 116. The mobile terminal/device 112 may comprise a digital broadcast receiver device. The service source 122 may be connected to several service providers that may provide their actual program content or information or description of their services and programs to the service source that further provides the content or information to the mobile device 112, which may be used and/or displayed as an electronic service guide for user to select their services and programs. The several service providers may include, but are not limited to, one or more television and/or digital television service providers, AM/FM radio service providers, Short Message Service/Multimedia Message Service (SMS/MMS) push service providers, and Internet content or access providers.

The broadcast network 114 may include a radio transmission of IP data casting over DVB-H. The broadcast network 114 may broadcast a service such as a digital or analog television signal and supplemental content related to the service via a transmitter 118. The broadcast network may also include a radio, television or IP data casting broadcasting network. The broadcast network 114 may also transmit supplemental content which may include a television signal, audio and/or video streams, data streams, video files, audio files, software files, and/or video games. In the case of transmitting IP data casting services, the service source 122 may communicate actual program content to user device 112 through the broadcast network 114 and additional information such as user right and access information for the actual program content through the cellular network 116.

The mobile device 112 may also contact the service source 122 through the cellular network 116. The cellular network 116 may comprise a wireless network and a base transceiver station transmitter 120. The cellular network may include a second/third-generation (2G/3G) cellular data communications network, a Global System for Mobile communications network (GSM), or other wireless communication network such as a wireless local area network (WLAN).

In one aspect of the invention, mobile device 112 may comprise a wireless interface configured to send and/or receive digital wireless communications within cellular network 116. The information received by mobile device 112 through the cellular network 116 or broadcast network 114 may include user selection, applications, services, electronic images, audio clips, video clips, and/or other messages. As part of cellular network 116, one or more base stations (not shown) may support digital communications with receiver device 112 while the receiver device is located within the administrative domain of cellular network 116.

Figure 2:
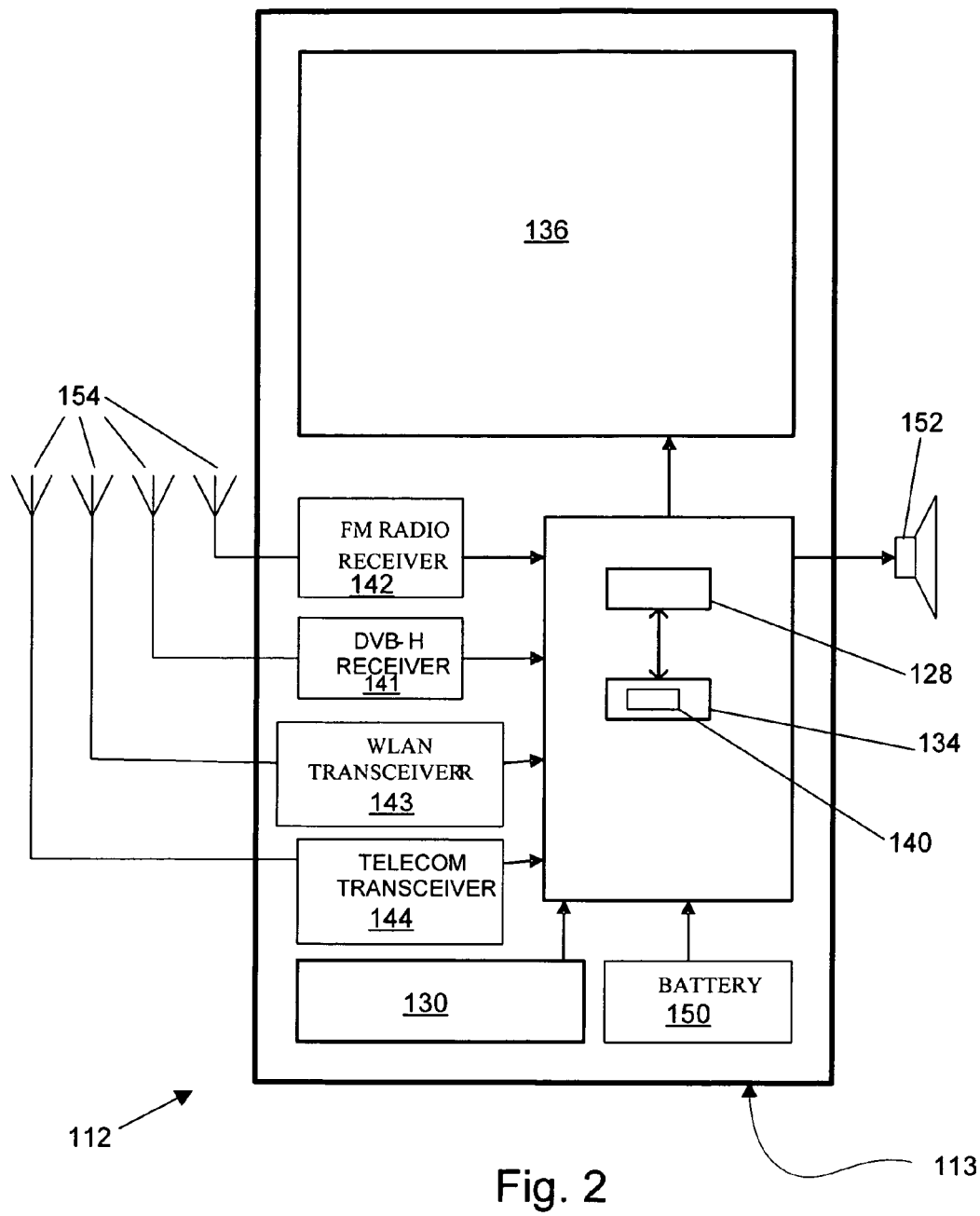
FIG. 2 illustrates a block diagram of a mobile terminal in accordance with an aspect of the present invention.

As shown in FIG. 2, mobile device 112 may include processor 128 connected to user interface 130, memory 134 and/or other storage, and display 136, all of which may be mounted on or in a housing 113. Mobile device 112 may also include battery 150, speaker 152 and antennas 154. User interface 130 may further include a keypad, touch screen, voice interface, one or more arrow keys, joy-stick, data glove, mouse, roller ball, touch screen, voice interface, or the like.

Computer executable instructions and data used by processor 128 and other components within mobile device 112 may be stored in a computer readable memory 134. The memory may be implemented with any combination of read only memory modules or random access memory modules, optionally including both volatile and nonvolatile memory and optionally being detachable. Software 140 may be stored within memory 134 and/or storage to provide instructions to processor 128 for enabling mobile device 112 to perform various functions. Alternatively, some or all of mobile device 112 computer executable instructions may be embodied in hardware or firmware (not shown).

Mobile device 112 may be configured to receive, decode and process transmissions based on the DVB standard, such as DVB-H or Digital Video Broadcast-Multimedia Home Platform (DVB-MHP), through a specific DVB receiver 141. Additionally, receiver device 112 may also be configured to receive, decode and process transmissions through FM/AM Radio receiver 142, WLAN transceiver 143, and telecommunications transceiver 144. In one aspect of the invention, mobile device 112 may receive Radio Data System (RDS) messages.

In an example of the DVB standard, one DVB 10 Mbit/s transmission may have 200 audio program channels at 50 kbit/s or 50 video (TV) program channels at 200 kbit/s. The mobile device 112 may be configured to receive, decode, and process transmission based on the DVB-H standard or other DVB standards, such as DVB-MHP, DVB-Satellite (DVB-S), DVB-Terrestrial (DVB-T) or DVB-Cable (DVB-C). Similarly, other digital transmission formats may alternatively be used to deliver content and information of availability of supplemental services, such as Advanced Television Systems Committee (ATSC), National Television System Committee (NTSC), Integrated Services Digital Broadcasting—Terrestrial (ISDB-T), Digital Audio Broadcasting (DAB), Digital Multimedia Broadcasting (DMB), MediaFLO or DIRECTV. Additionally, the digital transmission may be time sliced, such as in DVB-H technology. Time-slicing may reduce the average power consumption of a mobile terminal and may enable smooth and seamless handover. Time-slicing consists of sending data in bursts using a higher instantaneous bit rate as compared to the bit rate required if the data were transmitted using a traditional streaming mechanism. In this case, the mobile device 112 may have one or more buffer memories for storing the decoded time sliced transmission before presentation.

Figure 3:
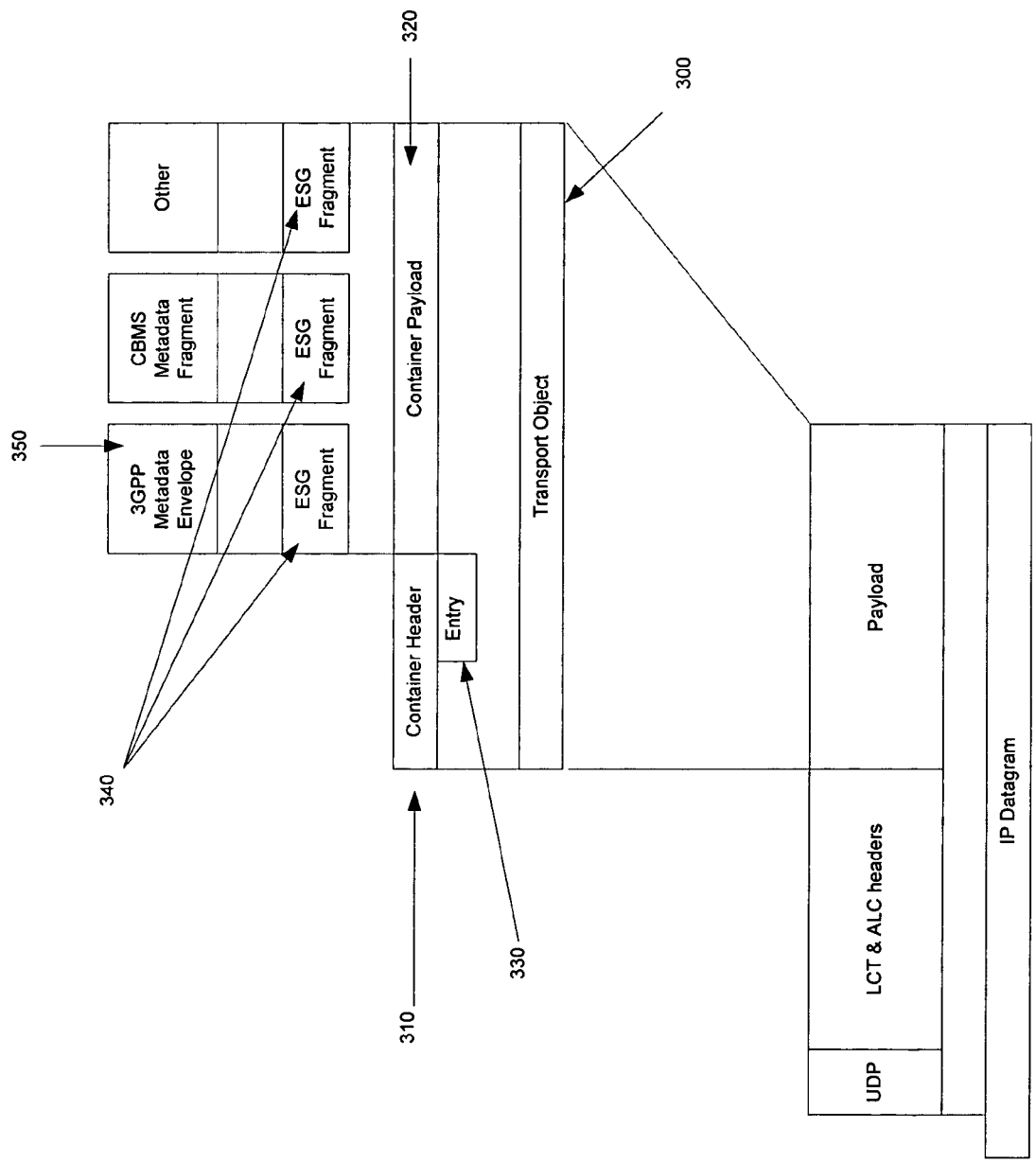
FIG. 3 illustrates a schematic diagram of an example transport object in accordance with an aspect of the present invention.

FIG. 3 is a schematic diagram of an example transport object in accordance with at least one aspect of the present invention. Generally, a single transport object 300 comprises a container header 310 and a container payload 320. By incorporating the header 310 and the payload 320 into a single object 300, there is no longer a need to recombine each header with the information regarding where each container is located within different transported objects. Furthermore, there is no longer an issue of which to transmit first, as presented in previous systems. The container header 310 may contain configuration information regarding the header and/or the container payload 320. In one embodiment, the header 310 is coded to inform a receiver of the entry length of the header.

In the exemplary embodiment, the header 310 may have a plurality of ESG fragment descriptor entries 330 that identify the ESG fragments 340 in the container payload 320 so that the receiver may determine the exact position and/or length of each contained ESG fragment 340. For example, in one embodiment, a field specifies where the particular ESG begins within the container payload 320 by providing, for example, an offset value 550, start and end points, or the like. In other embodiments, metadata 350 may be associated with the individual ESG fragments 340, located within or proximate to the header 310, descriptor entries 330, an ESG fragment 340 or a mixture thereof. In one exemplary embodiment, the association of a 3GPP metadata envelope with an ESG fragment 340 may substitute for, or negate the need of additional metadata to be located in the header 310 in relation to that particular ESG fragment.

Figure 4:
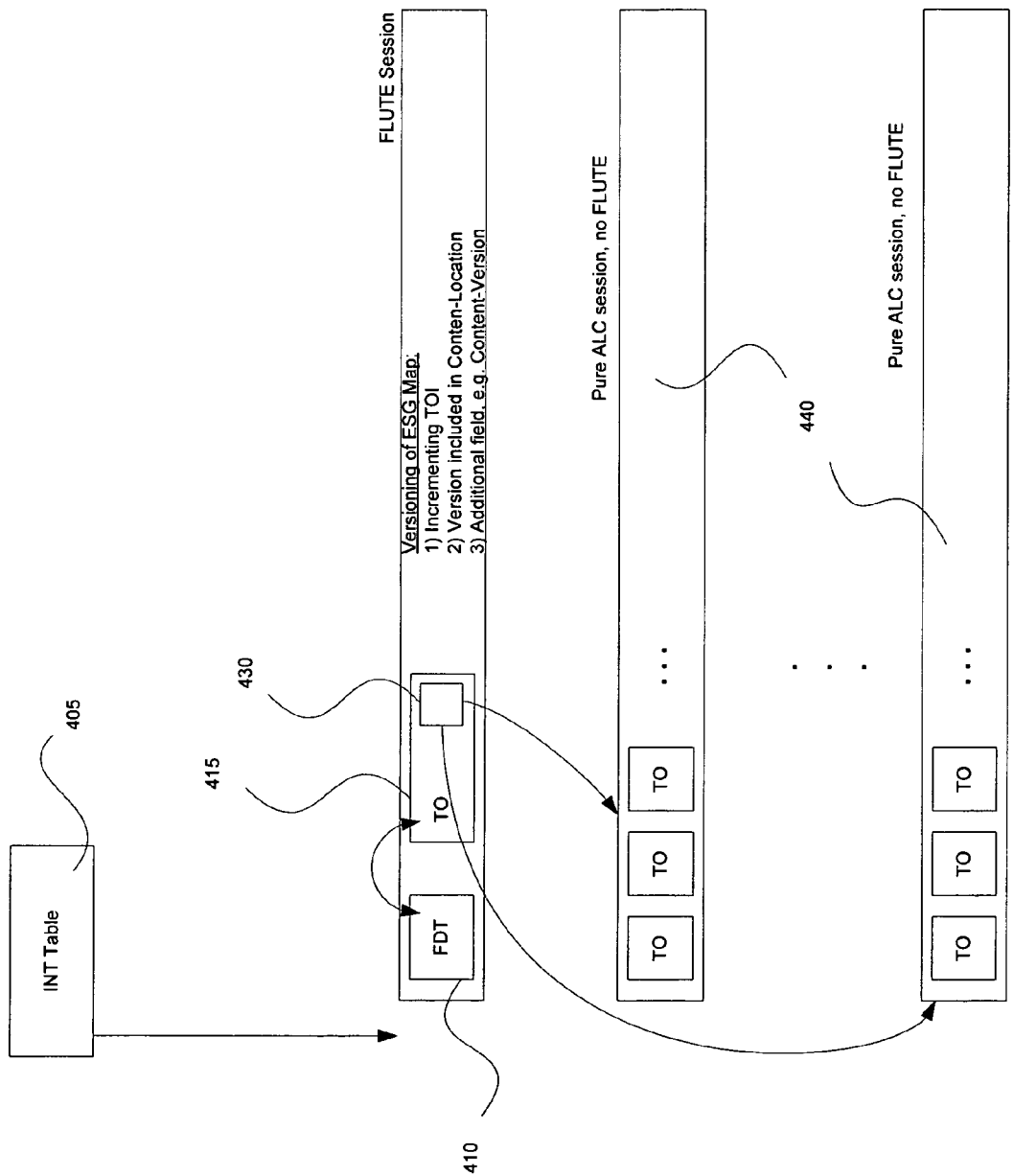
FIG. 4 illustrates a method of transporting a multitude of single object transports in accordance with an aspect of the present invention.

FIG. 4 illustrates a method of transmitting a multitude of single object transports wherein the transports are in accordance with at least one aspect of the present invention. As illustrated in FIG. 4, the transports objects (TO) of the current invention may be carried in, for example, File Delivery over Unidirectional Transport (FLUTE) sessions, or a pure ALC session. In the example of FIG. 4, the ESG Root Channel data, such as IP Address, port number and Transport Session Identifier (TSI), are announced in the IP/MAC Notification Table 405 (INT Table). The FLUTE session of the ESG Root Channel comprises a File Delivery Table 410 (FDT) of the said session and one or more transport objects 415. These transport objects in announcement carousels 430 contain mapping between the different parts of ESGs and access parameters to the different ESG methods in which the ESG data is transmitted. The ESGs may differ from each other e.g. as being in different languages and/or having different encoding or genre. The access parameters include IP Addresses, port numbers, TSIs, start and end times etc. The FLUTE session thus declares how the ESG data is distributed to different sessions. The transport objects 415 of the FLUTE session carrying this mapping data are described in the FDT of the FLUTE session. The ESG mapping data may be delivered in one or multiple transport objects 415. The mapping can be made using XML Schema, plain ASCII text, Structured ASCII text such as multipart MIME or MIME headers, as binary with enumerated types or through various other means as is known in the art. The ESG data is in this example delivered in ESG methods 440, which may be pure ALC sessions, in one or more transport objects. The same ESG data may be delivered in one or more ESG methods. The ESG data or parts of it may be delivered in some embodiments of the invention in one or more FLUTE sessions in addition to or instead of ALC sessions.

Figure 5A:
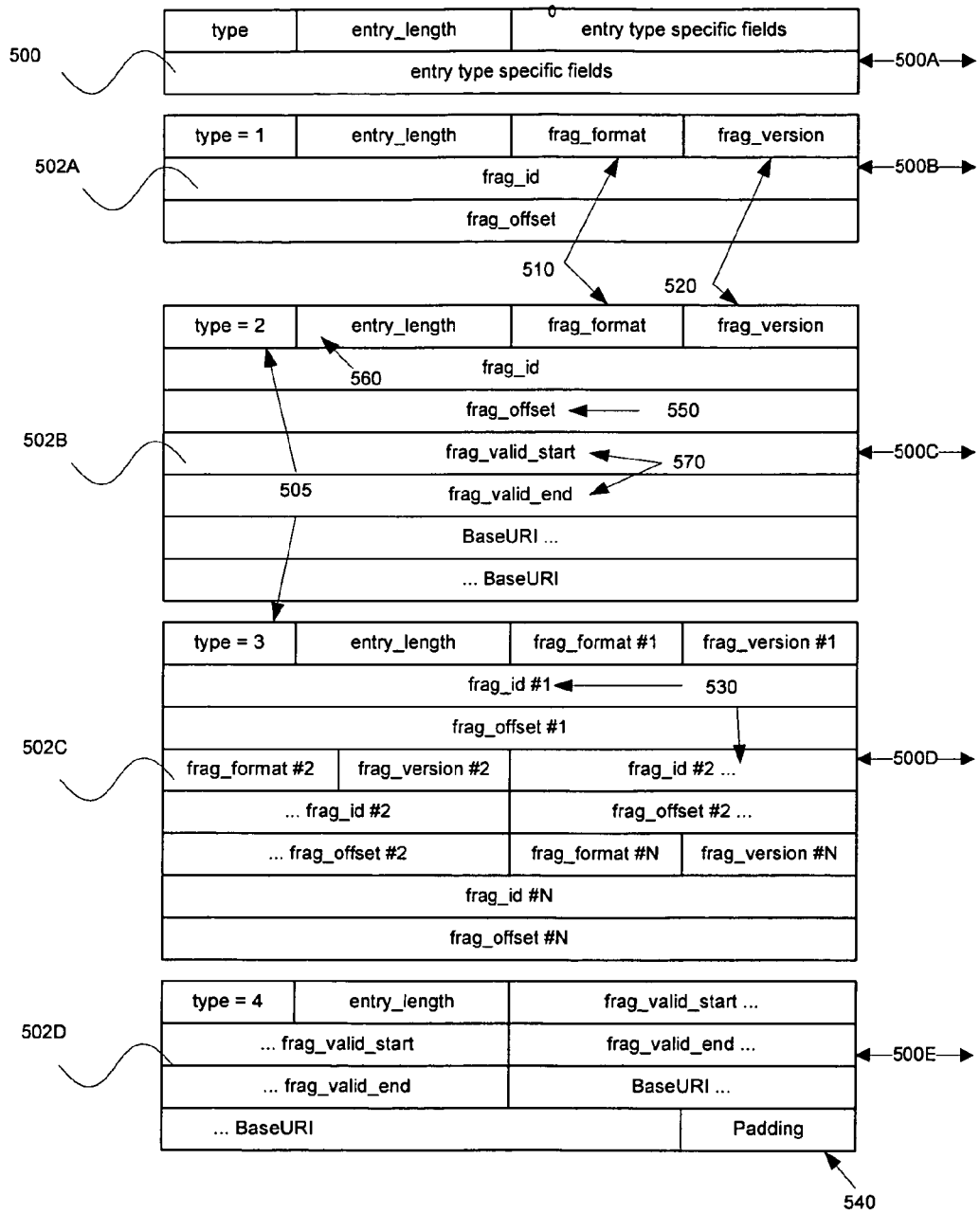

FIGS. 5a and 5b illustrate a block diagram of exemplary frames of ESG fragment descriptor entries along with descriptor entries 500A-500E in accordance with at least one aspect of the present invention. Frame 500 illustrates a format of the protocol frame for a header 310 (FIG. 3). The frames having descriptor entries 502A-D are exemplary instantiations which include a type field 505 to indicate the type and features of an entry 330. The type field may be extensible to allow for the addition of new types of entries. By inputting an entry type into this field 505, different information is available to the receiver. Frame instantiations 502A-D have predefined specific metadata associated with fragments. For example in 502B, the fields offset, start, end and Base Uniform Resource Identifier (BaseURI) are metadata for the corresponding fragment in the payload. Frame instantiation 502C, in turn, doesn't associate any metadata with the fragment it represents.

As described above, the payload may contain an envelope which associates metadata with the fragment itself (both included in the envelope) or indicate that metadata is located in the header, or alternatively the type is an entry that provides predefined parameters of the ESG fragments located within the payload. Furthermore, as shown by frame 502C, a single descriptor entry may be configured by its type to describe a plurality of ESG fragments, or even different versions of the same ESG fragment. For example, frame 502A is flagged as a type 1 entry, and includes information regarding the ESG fragments such as location, format, version information, a unique identifier. To illustrate this point, frames 502 may provide additional information fields regarding the ESG fragments 340 (FIG. 3), such as format 510, version 520, and a unique identifier 530. In the exemplary embodiment, the format field 510 specifies whether an ESG fragment 500 is text, a video, and/or a picture. One skilled in the art, however, will realize that the format field 510 could specify virtually any information concerning the type of media contained in the ESG fragment 340.

A version field 520 may be included to allow the updating of previously received ESGs. For example, a newer version of an ESG can be automatically detected and executed, whereas an outdated ESG fragment as specified by the version field 520 may not be executed or may be executed at the discretion of the user of the receiver. This is also often useful where local services are available. For example, when a mobile terminal moves from one geographical area to another geographical area, some services may remain available, some may no longer be available, and some may become available. Therefore, some of the ESG objects are valid in the new geographical area as in the old geographic area. In an embodiment, a terminal may identify those ESG objects which are valid in the new geographic area and may store/cache objects that are no longer valid. In another embodiment, a terminal may receive and store ESG objects from different frequencies, IP platforms, and network operators and then combine these objects with ESG objects from the current network into a unified ESG.

Optionally, a version field 520 may be coupled with or replaced by a validity field 570. While the version field 520 may indicate whether the received ESG fragment is the most current version or is configured to determine if compatibility issues exist, a validity field 570 may further separate useless or less prioritized ESG fragments. As illustrated in FIG. 5, one or more validity fields 570 may indicate time periods at which the associated fragment is valid. Alternatively, validity may be based on the receiver's hardware, user defined settings, and/or the presence of other ESGs. By way of example, the presence of a BaseURI or location where the node was loaded, whether in the validity field 570, or another field, can permit verification of a received ESG fragment. In other embodiments, a BaseURI may allow the receiver to utilize the information located at the URI in conjunction with or in place of the ESG fragment.

A unique identifier field 530 allows for the identification of an ESG fragment irregardless of the information in the container header 310. Such information would, for example, be useful when several ESGs are received, executed, or otherwise no longer associated with the header or otherwise need to be universally identifiable. Each of the above information fields 510, 520, 530, among other utilized fields may optionally contain a padding field 540 to compensate for improper alignment with the byte rules of the entries. For example, if the location of an ESG fragment contains a BaseURI that does not supply enough bits for the entry, ASCII characters, such as zero, may be used to fill the needed spaces to fulfill the bits requirement. As disclosed, each ESG fragment may be coded for a different bit rate than other ESG fragments. In yet further embodiments, different bit rates may be utilized for different parameters within a single ESG, for example, in the different information fields 510, 520, 530.

Location of an ESG fragment may be obtained by utilizing an offset field 550 alone or in conjunction with an entry length field 560, wherein the fragment's offset can be measured from the header, an initial point within the payload, or any other point within the transport object. The fragment offset and length value can be measured in bits, bytes, or any like quantifying system. As previously discussed, fields utilizing different systems (i.e. 6 bit, 10 bit, 32 bit) can all be can encoded within the same descriptor entry. Each descriptor entry 500 has a fragment identification field 530 which uniquely identifies the ESG fragment. In the exemplary descriptor entries 500C, 500D, 500E, the BaseURI is appended to the fragment's identification within the payload container to create a globally unique identifier.

Figure 6:
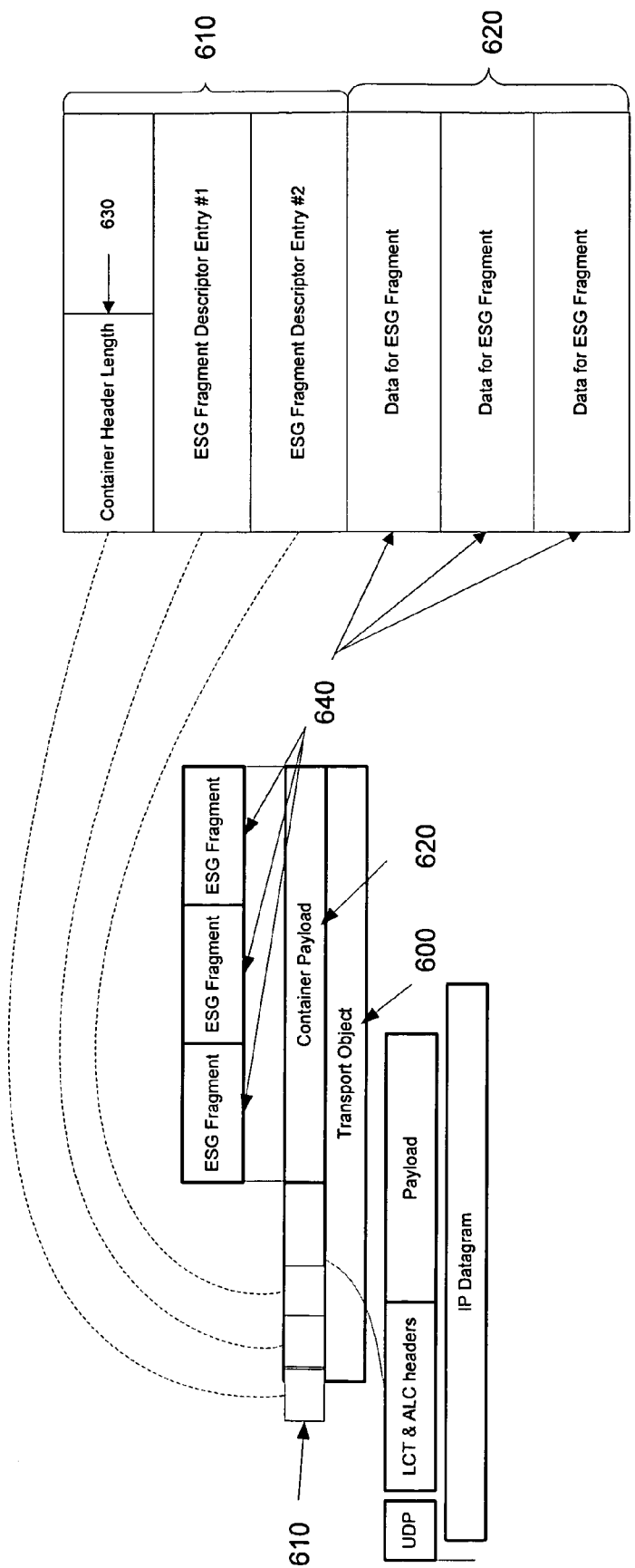
FIG. 6 illustrates a block diagram of an exemplary container having a plurality of ESG objects in accordance with at least one aspect of the present invention.

FIG. 6 illustrates a block diagram of an exemplary container having a plurality of ESG fragments in accordance with at least one aspect of the present invention. The transport object 600 has a container header 610 preceding a container payload 620, together forming a single transport object. The header 610 comprises a coding section regarding the header length 630. The header 610 may optionally contain a signaling mechanism or a transport encoding mechanism that is configured to signal that the transport object or a portion thereof is encoded or otherwise compressed. In one embodiment, an LCT codepoint, located in the beginning of the header 610, can signal that the entire transport including the header is compressed. In other embodiments, a reserve field may comprise a codepoint that signals the encoding for the transport object 600. By way of example, the program GZIP may be used for this purpose; however, one skilled in the art will recognize that numerous other alternatives will accomplish the goal of compression in this manner. In embodiments having a reserved field, additional information may optionally be included that relates, for example, to the ESGs, the header itself, or additional compression or encoding information. The container payload 620 comprises at least one ESG fragment 640, with some or all of the fragments having metadata (see FIG. 3). In some instances, the fragments do not have metadata, rather any requisite metadata is found in the header 610 associated with the appropriate descriptor entry. The transport object may be stored in a memory at the transmitter, intermediate transmission nodes, and/or in the various receivers.

Figure 7:
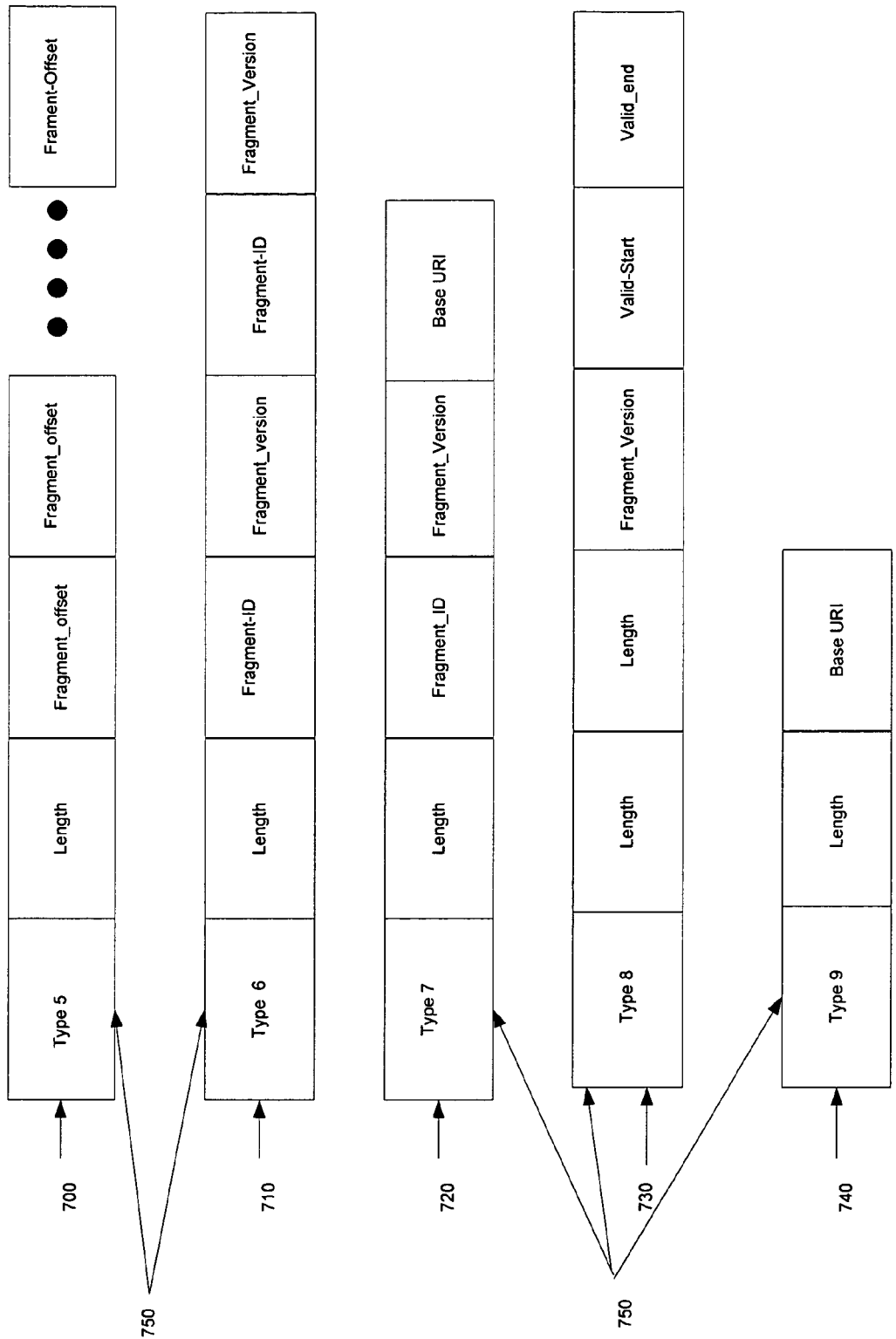
FIG. 7 is a block diagram illustrating further exemplary frames of ESG fragment descriptor entries in accordance with at least one aspect of the present invention.

FIG. 7 is a block diagram illustrating further exemplary frames of ESG fragment descriptor entries in accordance with at least one aspect of the present invention. The frames 700, 710, 720, 730, and 740 include a type field 750 to indicate the type of frame received. As discussed above, the type field 750 may be extensible to allow for the addition of new types of entries. Frame 700 illustrates a simple ESG descriptor entry that provides the position of ESG fragments in the payload. In the illustrated embodiment, an offset value of the ESG fragment is utilized to locate the fragments.

Frames 710, 720, and 730 illustrate the various types of descriptor entries that do not associate with any container payload. Rather, frames 710, 720, and 730 may be used to validate ESG fragments already received. In further embodiments, such as illustrated by frame 740, the descriptor entry may comprise a declaration of a BaseURI for the entire container.

In yet another aspect, the invention comprises a system and method of using the same to determine whether a newly transmitted container is a valid update of a previously received container without the need to decode or otherwise process the information within the container payload. In at least one embodiment, a transmitter is configured to update numerous fragments as a single unit. The transmitted container may be further configured to mandate all targeted fragments are updated. It yet still another aspect, the invention comprises a system and method of using the same that only requires a single instance of a container type to determine the combination of fragments in each other possible instance of the same type.

Figure 8:
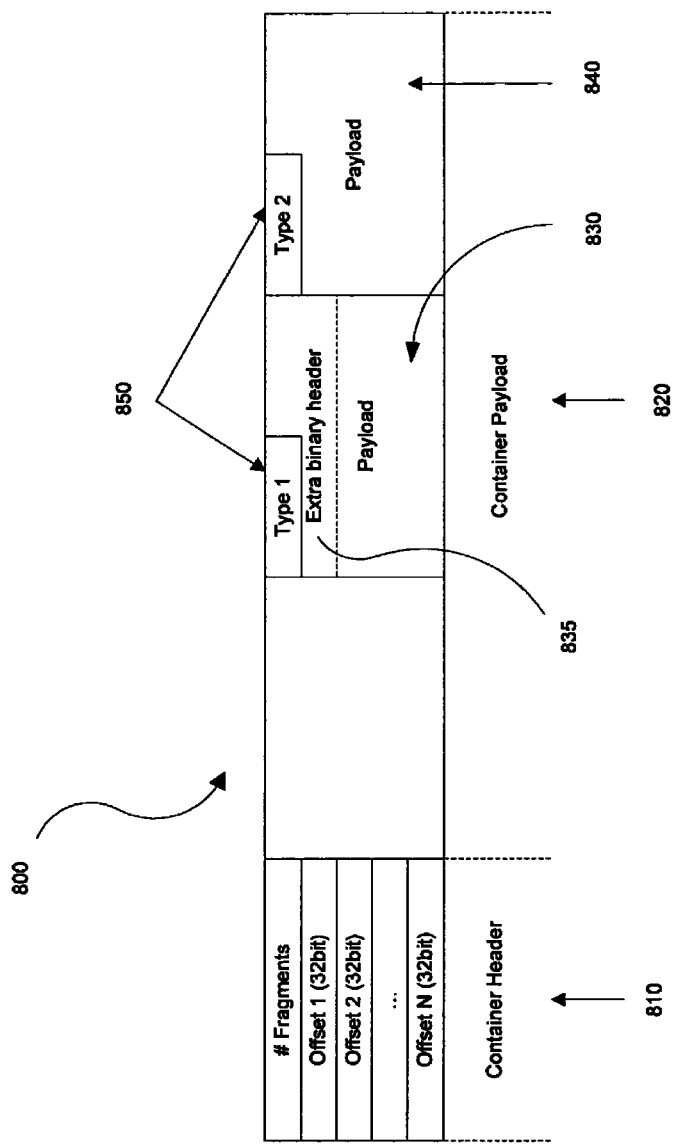
FIG. 8 is a block diagram of a simplified container system in accordance with one embodiment of the present invention configured for the updating of previously received fragments.

FIG. 8 is a block diagram of a simplified container system in accordance with one embodiment of the present invention configured for the updating of previously received fragments. The system is configured to determine whether the newly transmitted container is a valid update without the need to decode or otherwise read the information within the container payload. An update container 800 generally comprises a container header 810 and a container payload 820. In the exemplary embodiment, the header 810 contains information relating the number of fragments in the payload 820 and the associated offset values; however, it is within the scope of the invention to include information relating to the header 810 and/or payload 820. The payload 820 comprises data items 830, 840 having fragment updates. While the embodiment shows two data items 830, 840, the payload 820 may include additional data items (not shown) and may also transmit a single data item. Each data item includes an indication of its type 850.

The container may further indicate the presence of a payload header. For example, a type 1 data item could be a binary envelope having metadata in a header 835 as illustrated, the header 835 being associated with predetermined fragments. Type 2 may indicate a 3GPP textual envelope associated with different fragments. The metadata therefore, is not fixed on the transport level. In addition to these examples, other container types may be defined.

Figure 9:
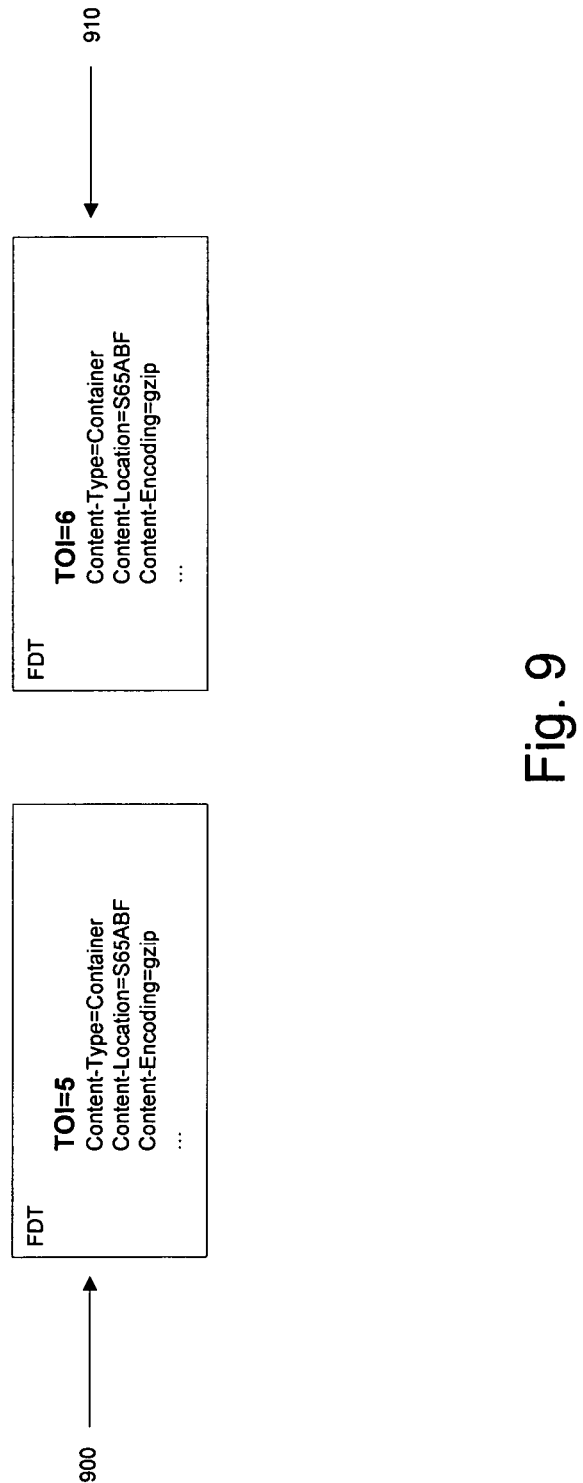
FIG. 9 is a block diagram illustrating container and fragment management in an updating system in accordance with one embodiment of the invention.

The novel updating system may be implemented through the configuration and management of the fragments and container instances. An "instance of fragments" or "fragment instance" concerns a fragment with specific type and version, wherein an "instance of a container" or "container instance" concerns a container holding specific instances of fragments. FIG. 9 is a block diagram illustrating the container and fragment management in an updating system in accordance with one embodiment of the invention. In the exemplary embodiment, FDTs 900 and 910 announce the instantiations of the grouping of fragments. The fragment types in each container type are determined by the receiver when initially receiving the first container instance. All different container instances of the same type use the same signature, for example FDT Content-Location, but a different transfer object identifier (TOI). In the exemplary embodiment, FDT 900 has a TOI=5 and FDT 910 has a TOI=6, thereby indicating a different container instance, however, the Content Type and Content-Location remain unaltered. Two different container instances may have different encoding applied, i.e. they have different Content types. For example a container holding fragments A of version A1 and B of version B1 and a container holding fragments A of version A2 and B of version B2 have the same container type. Additionally, a container holding fragment A (irregardless of the version) will have a distinctly different container type than a container holding fragments A, B and C (of any version). Additional optional fields, such as Content-Encoding can also remain in an unaltered state depending on the transmitter's preference. For example, if textual metadata is utilized, the entire container may be encoded with for example, GZIP or other mechanisms known in the art. Alternatively, some portion or portions of the container may be encoded.

Figure 10:
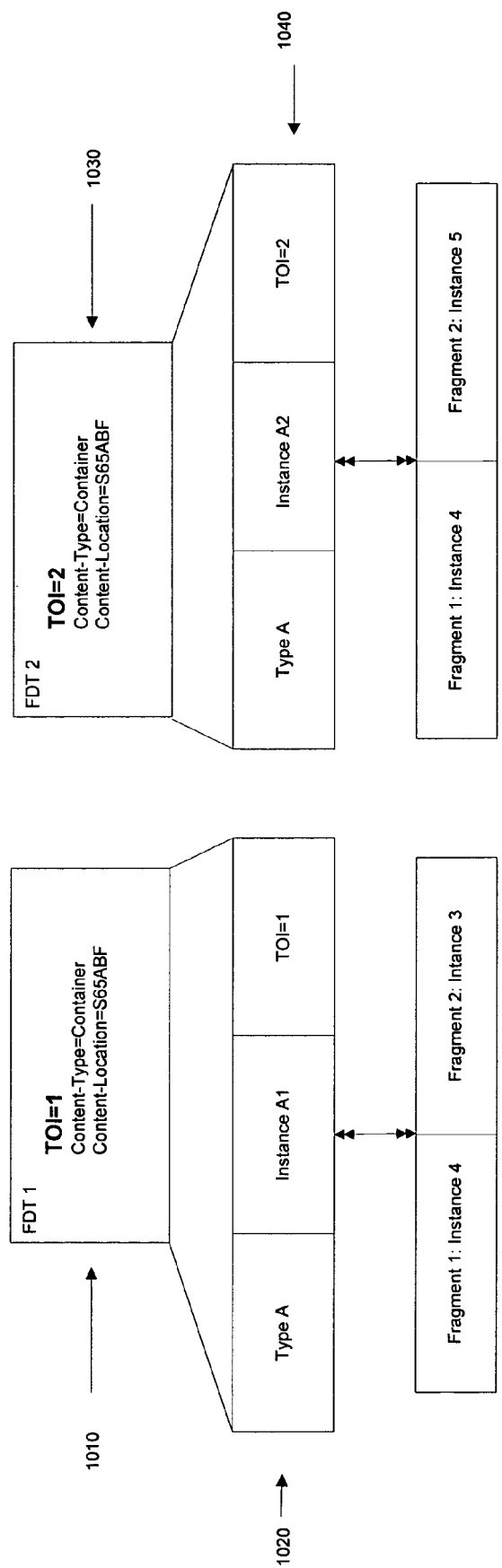
FIG. 10 is a block diagram illustrating a container update performed in accordance with an aspect of the invention.

Container encoding and Forward Error Correction (FEC) can be declared by different mechanisms. For example, FDT parameters may declare the encoding mechanism. In one embodiment, the encoding and FEC are declared through the use of LCT extensions. The containers are encoded to enable the receiver to determine if the container is to be decoded and processed without having to access or otherwise read the containers. FIG. 10 is a block diagram illustrating a container update performed in accordance with one embodiment of the invention. In the example, FDT 1010 has a TOI=1 and corresponds to a Type A container 1020 having an instance A1, wherein instance A1 may comprise for example fragment 1: instance 4 and fragment 2: instance 3. The FDT 1010 and the associated container 1020 are received at a terminal, where they are processed or rejected. The FDT 1030, represents an update to FDT 1010, and is received after the receipt of FDT 1010. FDT 1030 still corresponds to a Type A container 1040, however it includes instance A2 in place of instance A1, and may comprise changes such as, for example, fragment 1: instance 4 is not changed, but fragment 2: instance 3 is changed to instance 5. Upon receipt, the terminal determines that instance A2 includes one or more fragment updates as compared to instance A1. The terminal may further determine that A2 contains the same type of fragments as A1. In one embodiment, the terminal further determines, based on a myriad of factors, whether A2 is to be implemented.

Figure 16:
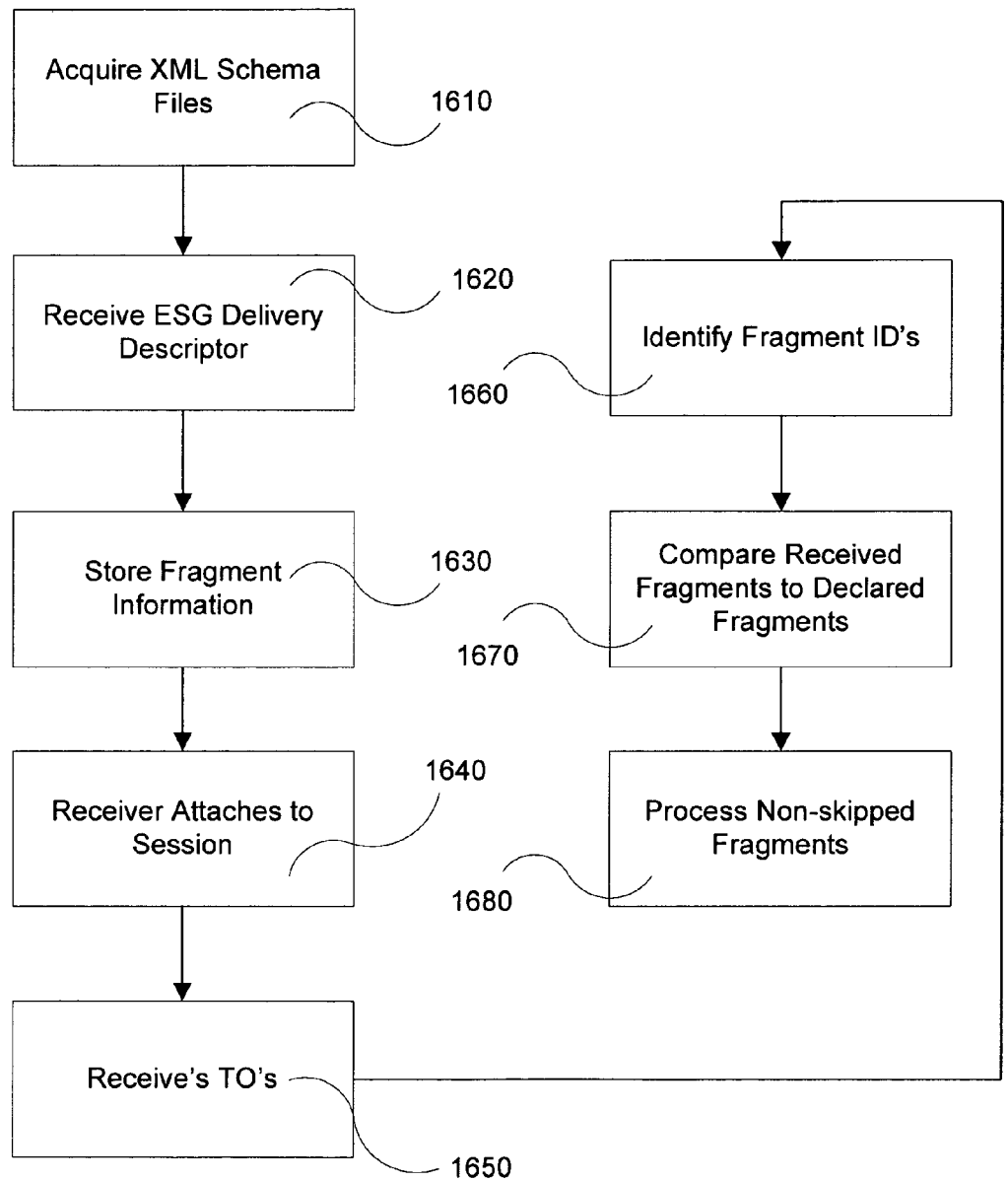
FIG. 16 illustrates a method of receiving data in accordance with an aspect of the present invention.

FIGS. 11-16 illustrate electronic service guide delivery solutions in accordance with various aspects of the invention. FIG. 16 illustrates an exemplary receiver method. First in step 1610, a mobile terminal or other receiver acquires the needed XML Schema file(s). This may be achieved by: pre-provisioning the files, fetching the files over interaction network, receiving the files in broadcast file delivery session (e.g. Announcement Carousel or other session) or by other methods for receiving data. In step 1620, the receiver may also receive an instance of ESG Delivery Descriptor. This may be XML or binary, with a binary instance tending to be more compact. (See FIGS. 13 and 14). The descriptor may contain one or many Session elements. The ESG Delivery Descriptor may be delivered in one ALC transport object. There may be several transport objects and these transport objects may further contain partly or completely overlapping Session elements. Thus, FDT is not required.

Next, in step 1630, for each Session group the receiver may store the declared ESG Fragment information for each declared fragment. It should be noted that the containerID information can be optionally used to point exactly to the correct container. Then in step 1640 the receiver may attach (tune or join) to the ALC/FLUTE session defined for the Session element. The receiver may then receive ALC transport objects in step 1650. The TOI field may optionally represent a containerID (and version). Thus, the transport object may be the container (an exemplary syntax of the container is shown in FIG. 15).

In step 1660, a receiver goes through the container header to identify the contained Fragment ID/Fragment version pairs and compares the contained or declared Fragments with a bookkeeping list of fragments. If the receiver encounters a fragment that already is known to the receiver and the encountered fragment is a version that is equal to or smaller than the version already contained within the receiver, the encountered fragment is skipped. The receiver then compares the list of received fragments to the list of declared fragments in step 1670 (in ESG Delivery Descriptor) and if everything that was declared has been received, the receiver determines that the delivery associated with that ESG Delivery Descriptor is complete. The receiver may then go into monitor mode and monitor changes triggered on the Announcement Carousel (or in layer below, for example in PSI/SI table INT). In step 1680 the non-skipped fragments are processed.

Another embodiment of the invention is described below. One problem in the prior art is that there are several different "views" that the broadcaster may want to declare to allow the receiver to determine completeness. The different "views" may contain partly or completely overlapping fragments. In accordance with an embodiment of the invention, a particular ESG fragment can be mapped to several sessions. In addition, besides Session groups there may be other types of groupings that represent "views" but do not contain any session access information. For example, there may be a session group that presents the next 8 hours of programming and a session group that presents the next 8-16 hours of programming. Each of these would declare their own lists of ESG Fragments and point to their own carousels. In addition there may be a specific "sport 16h" group that groups fragments that collectively present a "view" on sports programs for the next 16 hours but do not contain any session description. In such a case it is expected that the receiver will obtain the fragments primarily by other means.

Another problem in the prior art relates to how to provide alternative accesses to a particular group. In accordance with an embodiment of the invention, a "group" is generalized. An ESG Delivery Descriptor may carry 0 . . . N Groups. Each Group may contain 0 . . . X Access attributes and 0 . . . Y ESG Fragments. Additionally the Group may container other information related to either group level (such as group name, validity), access (such as access parameters to FLUTE or ALC session, access parameters for web server serving ESG—http://www.exampleserver.com/esg—which is appended with group name and or fragment IDs, etc.) or ESG Fragment (ID, version, target container, type, etc.). An aspect of the invention handles the problem as follows: the broadcaster defines a group that contains, for example, one access pointing to a FLUTE/ALC session (broadcast reception) and one access pointing to a web server (fetch over interaction channel). There may be several different broadcast accesses and bi-directional accesses at the same time. This solution may also addresses the problems described in the prior paragraphs.

As noted above in the discussion of FIG. 16, non-skipped ESG fragments may be handled by the receiver. To handle the fragments, the receiver will typically need the correct schema. The receiver may acquire the needed schema files in variety of different methods, such as pre-provision of the schemas, fetching the schemas over an interactive network or receiving the file in a broadcast file delivery session, such as an Announcement carousel.

Figure 17:
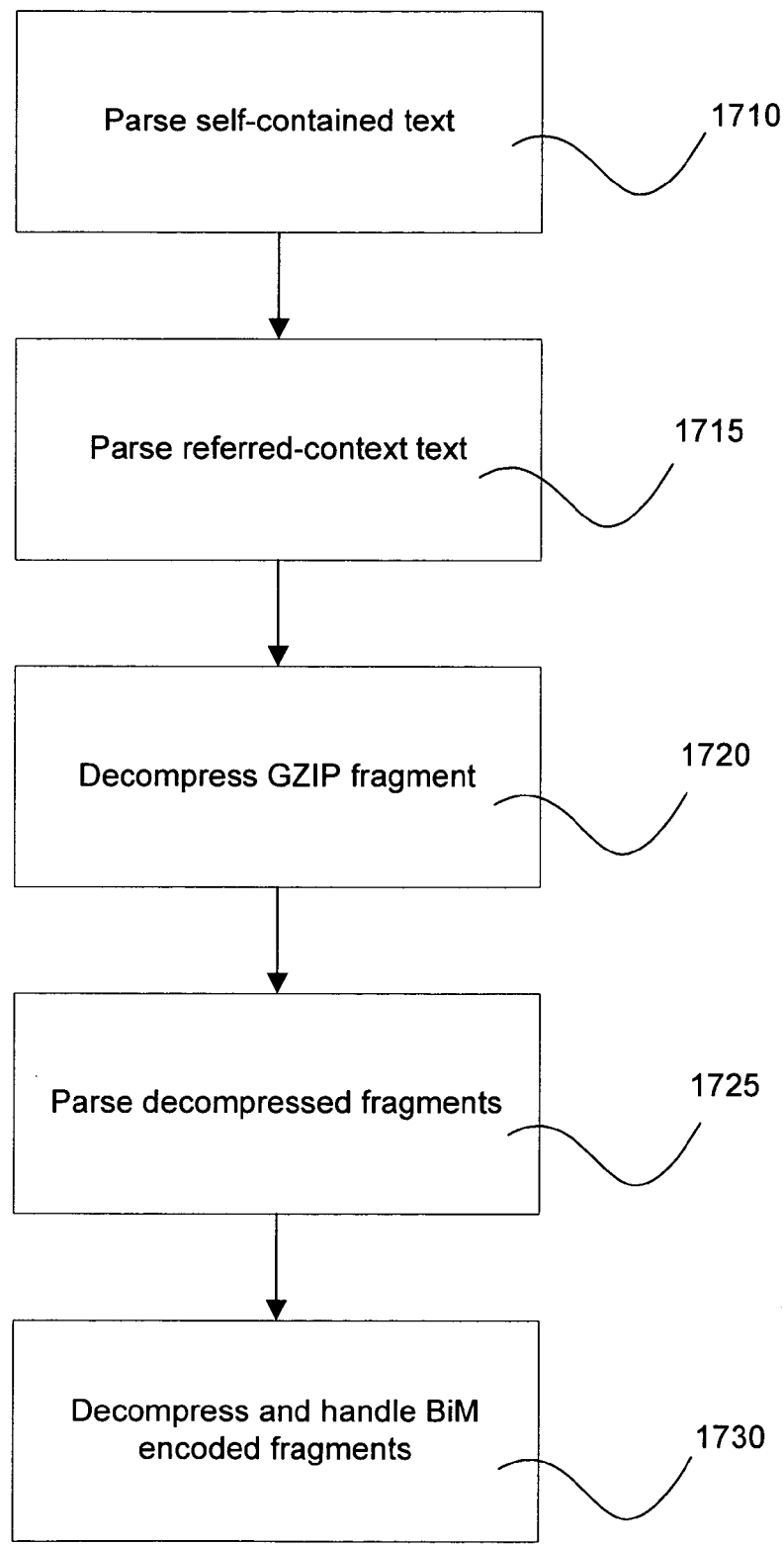
FIG. 17 illustrates a method of handling received data in accordance with an aspect of the present invention.

FIG. 17 illustrates an exemplary handling method for the non-skipped ESG fragments. It should be noted that if the offsets and container length are known, the receiver can determine the position and length of each ESG fragment. In general, each ESG fragment may be encoded with a given fragment encoding such as GZIP, thus the encoded fragments can be handled as follows:

First, in step 1710, the self-contained plain text XML is parsed with a XML parser. As can be appreciated, the self-contained plain text does not require additional steps to be parsed and thus can be parsed as delivered. In other words, the self-contained plain text may be a stand-alone document that has any needed context contained within the document. Here, context refers to a schema or schema rules and is a guide for indicating and/or providing the syntax and semantics of the document.

Next, in step 1715, a referred-context plain text XML is parsed with the XML parser. It should be noted that the XML parser may be initialized with a referred schema, an example of which is provided in FIGS. 13 and 14, (which may be provided in the ESG Delivery Descriptor). The referred schema or context defines the XML structure and provides information regarding which fields are the XML document and which fields are the grammar for the document. As can be appreciated, the schema may be provided in a variety of formats.

In step 1720, GZIP compressed fragments are decompressed into plain text. In step 1725, the previously GZIP compressed fragments are parsed as discussed in step 1710 and 1715. Next, in step 1730, the BiM compressed fragments are handled according to the BiM specification. Of course, if no portion of the fragment is compressed then steps 1720-1730 may be omitted. In addition, if other methods of compression are used, the compressed portion of the container, which may be the entire container, may be handled as appropriate. Thus, in an embodiment, the container will require decompression before any parsing may be done.

It should be noted that it may be suitable to have the ESG fragments provided as one or more self-contained XML documents in plain text. When there are several such documents in the payload and the container payload is compressed (payload_compression set to 0x01, for example), the GZIP algorithm takes care of redundancy.

In an embodiment, the ESG Delivery Descriptor may declare a container by using a container ID equal to the TOI. Thus, for example, a container in the ESG delivery session may be the TOI, which may be a single TO 300 that comprises the header 310 and the container payload 320 (FIG. 3). The TO may be in the Announcement carousel and the TO may contain a mapping between different parts of the ESG and may include parameters that are accessed by the different methods in which the ESG data is transmitted.

In an embodiment there may be multiple ESGs and the ESGs may differ from each other. For example, the different ESGs may be in different languages and/or have different encoding or be different genres. In an embodiment, the languages may be described by listing values of fields in fragments.

Figure 11:
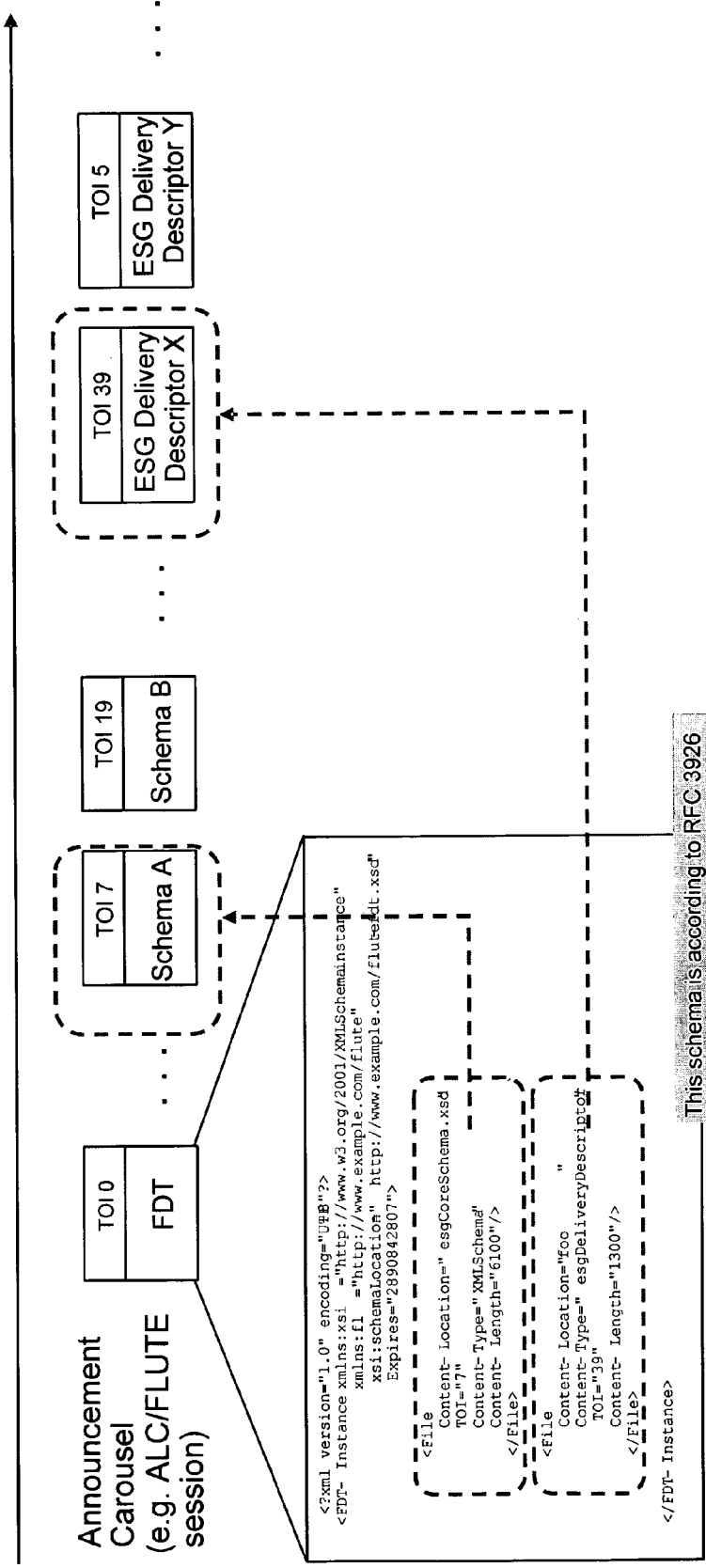
FIG. 11 illustrates an ESG delivery solution in accordance with an aspect of the present invention.

Schema A, an example of which is described in FIG. 13 and is depicted in FIG. 11 as by TOI 7, may be delivered to the terminal. In an alternative embodiment, the terminal may wait to receive the schema until after reviewing the declaration in ESG Delivery Descriptor or reviewing the PSI/SI table identifier to see if a new ESG, or some portion of the current ESG, is needed. Thus, in an embodiment the schema is only received once the schema is determined to be needed.

As noted above, in an embodiment the schema may be pre-provisioned. In such an example, the FDT is optionally not used but instead all ALC objects are ESG Delivery Descriptors. The new ESG Delivery Descriptors may be identified as the new TOI appears. To deliver the FEC OTI information within the ALC packets, EXT_FTI may be used.

Figure 12:
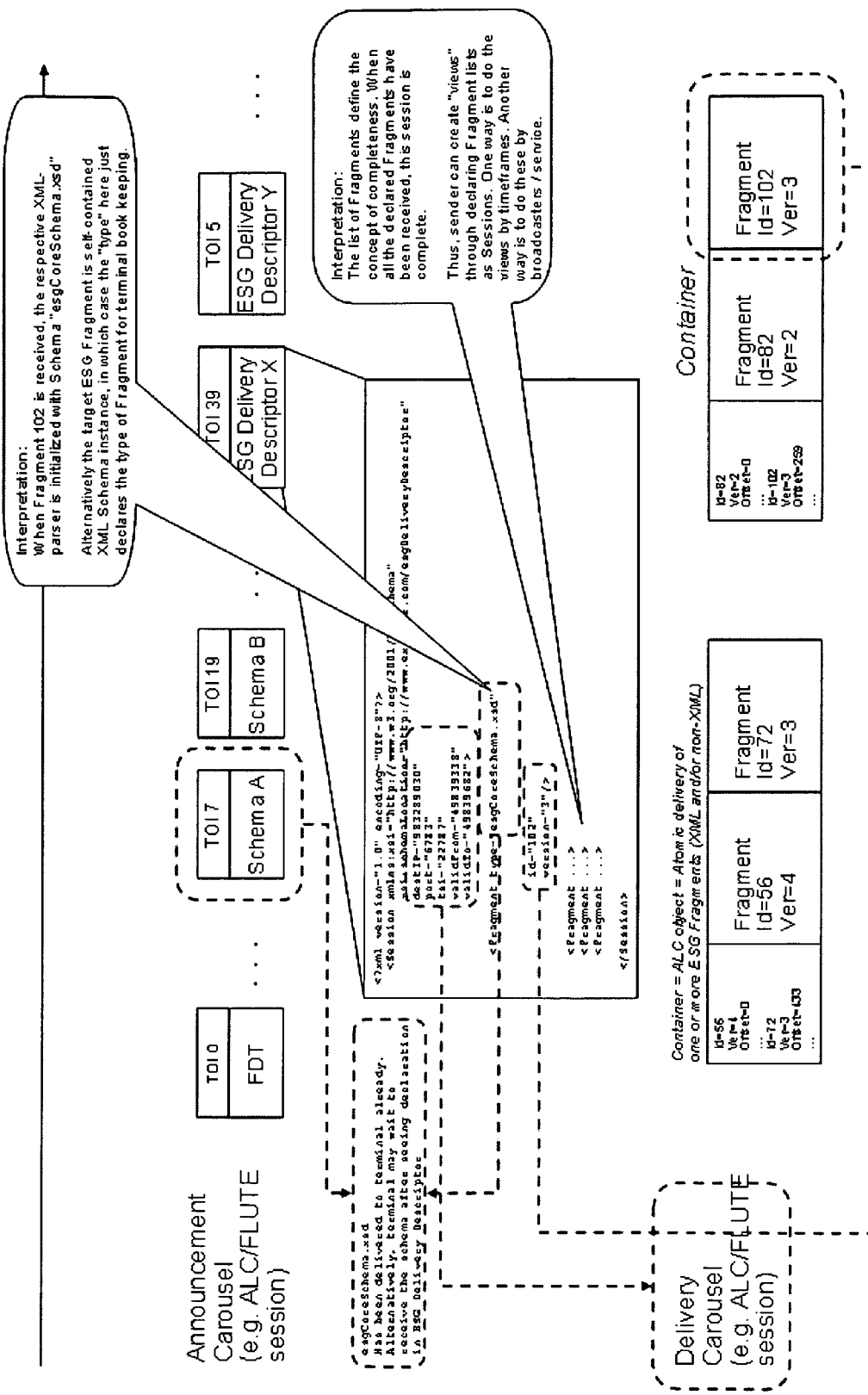
FIG. 12 illustrates an ESG delivery solution in accordance with an aspect of the present invention.

As noted in FIG. 12, when the fragment 102, identified by fragment id "102," is received, the respective XML-parser is initialized with Schema "esgCoreSchema.xsd". As can be appreciated from the example provided below, the offset can be used to determine the size and location of the fragments.

| Id = 82<br>Ver = 2<br>Offset = 0<br>...<br>Id = 102<br>Ver = 3<br>Offset = 259<br>... | Fragment<br>Id = 82<br>Ver = 2 | Fragment<br>Id = 102<br>Ver = 3 |
|---|---|---|

The container may be the same as the ALC object or atomic delivery of one or more ESG Fragments (XML and/or non-XML). An example of the container syntax is provided in FIG. 15. In an embodiment in accordance with the present invention, a respective item is located in the container defined in the ESG Delivery Descriptor X TOI 39 based on the fragment ID 102. In an alternative embodiment, the target ESG fragment may be a self-contained XML Schema instance, in which case the "type" here just declares the type of fragment for terminal bookkeeping and the terminal may evaluate the type to determine whether conditions are met in order to do the next step.

The list of one or more fragments in the ESG Delivery Descriptor defines the concept of completeness. When all the declared fragments in the ESG Delivery Descriptor have been received, the ESG delivery session is complete and the ESG can be viewed by the terminal.

Thus, a sender can create "views" by declaring fragment lists as Sessions and the terminal can view accordingly. One exemplary method of declaring views is to declare the views by timeframes, as discussed above. Another exemplary method is to declare views by broadcasters/service.

The following ESG Schema for ESG Delivery Descriptor describes an exemplary embodiment according to an aspect of the invention. The use of the symbol "//" denotes that an explanation of the previous item is being provided. As can be appreciated, other ESG Schema may be provided.

```
<?xml version="1.0" encoding="UTF-8"?>
  <xs:schema xmlns:xs="http://www.w3.org/2001/XMLSchema"
                                elementFormDefault:xs="qualified"
targetNamespace:xs="http://www.example.com/esgDeliveryDescriptor">
       <xs:element name="Session" maxOccurs="unbounded">
          <xs:complexType>
             <xs:sequence>
                <xs:element name="Fragment"
                   maxOccurs="unbounded">
                   <xs:complexType>
                      <xs:attribute name="type"
                         type="xs:anyURI"
// This URI gives the namespace of target fragment. I.e. it identifies
the ESG XML Fragment type. Use mime:<type> for non XML.
                         use="required"/>
                      <xs:attribute name="id"
// The ID of ESG Fragment. (32 bits)
                         type="xs:positiveInteger"
                         use="required"/>
                      <xs:attribute name="version"
// The version of ESG Fragment (32 bits). The value is the NTP
timestamp
                         type="xs:positiveInteger"
                         use="optional"/>
                      <xs:attribute name="containerId"
// This indicated in which Container ID the Fragment ID is carried.
                         type="xs:positiveInteger"
                         use="optional"/>
                      <xs:attribute name="name"
```

-continued

```
// This gives the name of the Fragment. Used only with non XML ESG
Fragments.
                         type="xs:anyURI"
                         use="optional"/>
                      <xs:anyAttribute
                         processContents="skip"/>
                   </xs:complexType>
                </xs:element>
             </xs:sequence>
             <xs:attribute name="destIP"
                         // Destination IP address of target
                         FLUTE/ALC session.
                         type="xs:positiveInteger"
                            // Is there XML-schema
                            type for IP address?
                         use="required"/>
             <xs:attribute name="port"
// Port of target FLUTE/ALC session
                         type="xs:positiveInteger"
                         use="required"/>
             <xs:attribute name="tsi"
// TSI of target FLUTE/ALC session
                         type="xs:positiveInteger"
                         use="required"/>
             <xs:attribute name="validFrom"
// NTP timestamp. 32 bits.
                         type="xs:positiveInteger"
                         use="optional"/>
             <xs:attribute name="validTo"
// NTP timestamp. 32 bits.
                         type="xs:positiveInteger"
                         use="optional"/>
             <xs:anyAttribute
                         processContents="skip"/>
// Allows one to tag the session with any thinkable attribute, for
example "genre", or, "channel"
          </xs:complexType>
       </xs:element>
    </xs:schema>
```

As mobile devices are generally expected to move and land based antennas typically have limited range, it may be useful to provide for movement between antennas or cells. The following example of an embodiment of an aspect of the invention (illustrated by FIG. 18 and FIG. 19) describes the use of a target_IPv6_esg_root_descriptor in the case when the terminal moves within a network with two different ESG areas of a platform A (platform_id=0x000010) and simultaneously within two different ESG areas of a platform B (platform_id=0x000011). IP data may be delivered to all IP Encapsulators (IPE) by the service system. Each transmitter may be fed with IPEs. As depicted, each platform has a unique destination address for all sessions/IP streams and each ESG area (a subset of the platform) has unique source and destination addresses for all sessions/IP streams.

Figure 18:
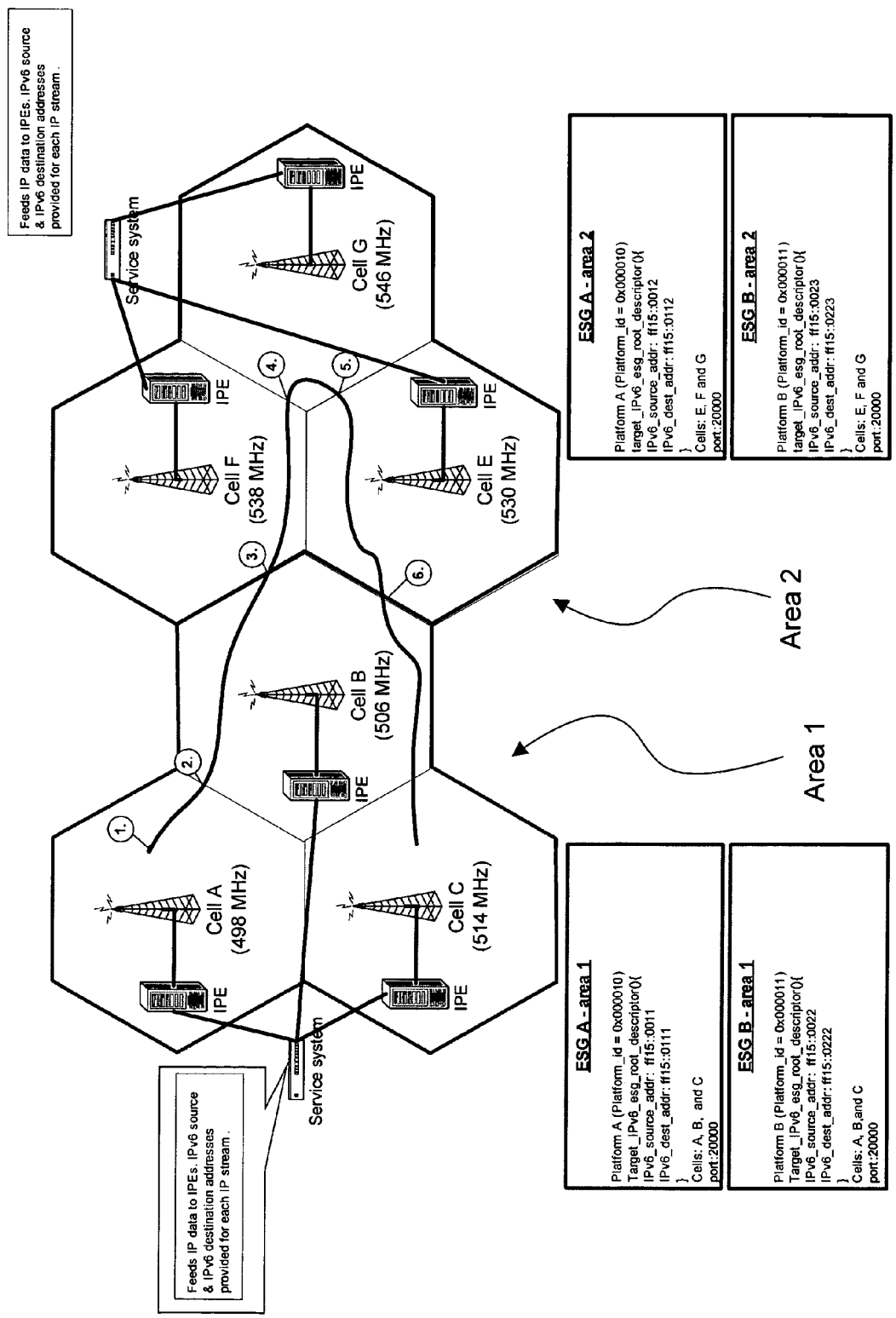
FIG. 18 shows schematic of an exemplary wireless communication system in accordance with an aspect of the present invention.
Figure 19:
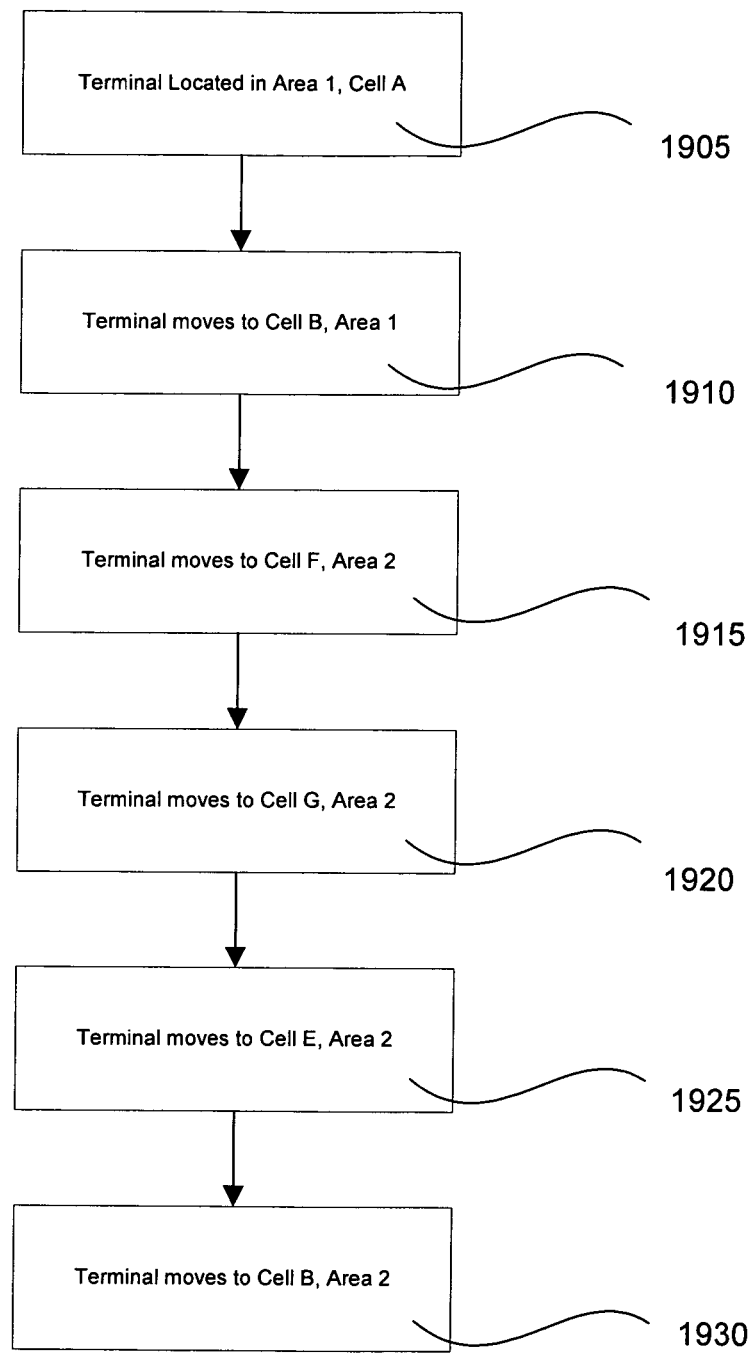
FIG. 19 illustrates a method of providing information to a receiver traveling between different areas in accordance with an aspect of the present invention.

For ease of understanding, the method depicted in FIG. 19 refers to the schematic depicted in FIG. 18. Turning to FIG. 19, in step 1905 the terminal is located in Cell A of area 1. The terminal acquires the following information:

```
Platform A (platform_id = 0x000010):
   Target_IPv6_esg_root_descriptor:
      IPv6_source_addr = ff15::0011
      IPv6_destination_addr = ff15::0111
Platform B (platform_id = 0x000011):
   Target_IPv6_esg_root_descriptor:
      IPv6_source_addr = ff15::0022
      IPv6_destination_addr = ff15::222
```

Next in step 1910, the terminal moves from cell A to cell B, which is also located within area 1. During the move, the terminal performs a handover from cell A to cell B. As the terminal moves to the new cell, it receives the source and destination addresses from the target_IPv6_esg_root descriptor. If these addresses are the same, as would be the case when moving from cell A to cell B, the terminal can conclude that it is still in the same area (e.g. area 1). Therefore, the terminal does not need to update the ESG unless the previously acquired ESG has expired.

Next, in step 1915, the terminal moves from cell B to cell F, which is also a move from area 1 to area 2. As the terminal moves, the terminal performs a handover from cell B to cell F. The terminal receives the source and destination addresses from the target_IPv6_esg_root descriptor. As cell F is in a different area than cell B, the move from area 1 to area 2 causes the source and destination addresses of ESG to change as follows:

```
Platform A (platform_id = 0x000010):
   Target_IPv6_esg_root_descriptor:
      IPv6_source_addr = ff15::0012
      IPv6_destination_addr = ff15::0112
Platform B (platform_id = 0x000011):
   Target_IPv6_esg_root_descriptor:
      IPv6_source_addr = ff15::0023
      IPv6_destination_addr = ff15::0223
```

As the source and destination addresses have changed, the terminal can conclude that the area has changed. Therefore, the terminal updates the ESG so that the ESG corresponds to the new area (e.g. area 2). As the ESG may be provided in fragments, the terminal may be able to selectively update the fragments that are different. In an embodiment, the ESG may be the same for area 1 and area 2, in which case the terminal may not have to update the ESG.

Next, in step 1920, the terminal moves to cell G. As the terminal moves, the terminal performs a handover from cell F to cell G. As cell F and cell G are in the same area, the source and destination addresses of target_IPv6_esg_root descriptor remain the same for both platform A and platform B. Therefore, the terminal can determine that the area has not changed during the move between cells. Thus, the terminal may limit the updating to a previously acquired ESG if it has expired. Accordingly, the move between cell F and G may not require any update to the ESG.

Next, in step 1925, the terminal moves from cell G to cell E. As before, the terminal performs a handover from cell G to cell E. As both cell G and cell E are in area 2, the source and destination addresses of target_IPv6_esg_root descriptor remain the same. Therefore, the terminal can conclude that the area has not changed and that the ESG does not have to be updated unless it has expired.

Next in step 1930, the terminal moves from cell E to cell B. As before, the terminal performs a handover from cell E to cell B. The terminal checks the source and destination addresses of target_IPv6_esg_root descriptor and determines that the source and destination addresses of the ESG change as follows:

```
Platform A (platform_id = 0x000010):
   Target_IPv6_esg_root_descriptor:
      IPv6_source_addr = ff15::0011
      IPv6_destination_addr = ff15::0111
Platform B (platform_id = 0x000011):
   Target_IPv6_esg_root_descriptor:
      IPv6_source_addr = ff15::0022
      IPv6_destination_addr = ff15::0222
```

As the source and destination addresses have changed, the terminal determines that the area has changed. Therefore, the terminal updates the ESG as appropriate. As noted above, the updating of the ESG may be limited to the differences, if any, between the ESG for area 2 and the ESG for area 1.

It should be noted that, while the ESG areas of a platform A are depicted as being the same as the ESG area of a platform B, in an embodiment the areas of A and B may be different.

In one further embodiment of an aspect of the invention, additional and/or optional metadata may be added in the ESG delivery descriptor, such as genre, parental rating, title, serviceName, record etc . . . such as may be provided by way of the XML Schema. In another embodiment of invention, the terminal may be configured to pre-select fragments based on the additional/optional metadata in order to decide what ESG fragment to receive.

In one embodiment of the invention, ESGs are delivered by broadcasting one or more ESG delivery sessions. In another embodiment, ESGs are delivered over an interaction channel. Alternatively any other transport may be used, for example, DVB service discovery selection transport protocol (DVB-STP) or Multicast File Delivery Protocol (MFDP) may be used. The container may even be omitted, in which case single ESG Fragments could be treated as such.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended embodiments.

We claim:

1. A method comprising:
    partitioning data of an service guide to form at least one fragment in a service guide delivery session;
    assembling the at least one fragment in at least one container of a transport object of the service guide delivery session;
    associating the at least one fragment with an at least one service guide delivery descriptor, the at least one service guide delivery descriptor declaring the at least one fragment for the service guide delivery session in a list of one or more fragments declared for the service guide delivery session, comparing the declared at least one fragment to an existing bookkeeping of one or more fragments of the service guide assembled by at least one prior service guide delivery session and the list of one or more fragments declared for the service guide delivery session, pinpointing the declared at least one fragment in the correct at least one container;
    determining to transport the transport object including the at least one fragment in the at least one container on at least one carrier; and
    providing a new service guide delivery descriptor and allocating a new transfer object identifier (TOI) with new content if there is change in the new service guide delivery descriptor compared to the at least one service guide delivery descriptor.

2. The method of claim 1, wherein the at least one missing fragment of the service guide delivery session comprises a plurality of missing fragments, the method further comprising:

updating the service guide using one of the plurality of missing fragments of the service guide delivery session at a time.

3. The method of claim 2, wherein the terminal stops listening to the service guide delivery session once all the plurality of missing fragments declared by the service guide delivery descriptor are received.

4. The method of claim 1, wherein the at least one service guide delivery descriptor provides a complete list of one or more fragments needed from the service guide delivery session.

5. The method of claim 1, further comprising:
pinpointing the at least one fragment in the service guide delivery session to a specific transport object containing the at least one fragment.

6. The method of claim 1, further comprising:
receiving the at least one fragment in a terminal; and
using an Extensible Markup Language (XML) Schema to initialize an XML-parser associated with the at least one fragment.

7. The method of claim 1, further comprising:
using a list of the at least one fragment to define a completeness of an service guide after the at least one declared fragment has been received; and
creating a plurality of views through the at least one declared fragment.

8. The method of claim 1, wherein the at least one fragment has an identifier (ID) for identification and the ID is declared in the service guide delivery descriptor.

9. The method of claim 1, further comprising:
compressing at least a portion of the at least one container.

10. A non-transitory computer-readable medium having computer-executable instructions for performing the method recited in claim 9.

11. A non-transitory computer-readable medium having computer-executable instructions for performing the method recited in claim 1.

12. A method comprising:
reading, via one or more processors of a mobile terminal, a list of fragments declared for a service guide delivery session in a service guide delivery descriptor;
comparing, via the one or more processors, the list of fragments to an existing bookkeeping in the mobile terminal;
determining, via the one or more processors, whether the service guide delivery session contains at least one missing fragment;
reading, via the one or more processors, the service guide delivery session if the service guide delivery session contains at least one missing fragment, and
pinpointing the at least one fragment in the service guide delivery session to a specific transport object containing the at least one fragment,
wherein reading the service guide delivery session includes determining, via the one or more processors, a container of the transport object of the service guide delivery session associated with the at least one missing fragment and reading, via the one or more processors, the container.

13. The method of claim 12, further comprising:
repeating the method for each service guide delivery session.

14. The method of claim 12, wherein the mobile terminal is configured to update the service guide using only a subset of the service guide delivery session at a time.

15. The method of claim 12, wherein a metadata is added in the service guide delivery descriptor.

16. The method of claim 15, wherein the terminal is configured to pre-select fragments based on the metadata in order to determine what service guide fragment to receive.

17. A non-transitory computer-readable medium having computer-executable instructions for performing the method recited in claim 12.

18. An apparatus comprising:
a processor;
programmed with computer-readable instructions to perform:
partitioning of service guide data to form at least one fragment,
assembling the at least one fragment in at least one container of a transport object,
associating the at least one fragment with a service guide delivery descriptor, the service guide delivery descriptor declaring the at least one fragment in a list of one or more fragments declared for a service guide delivery session, comparing the declared at least one fragment to an existing bookkeeping of one or more fragments of the service guide assembled by at least one prior service guide delivery session and the list of one or more fragments declared for the service guide delivery session, pinpointing the declared at least one fragment in a correct at least one container of the service guide delivery session;
determining to transmit the transport object including the at least one fragment in the at least one container in the service guide delivery session on at least one carrier; and
providing a new service guide delivery descriptor and allocating a new transfer object identifier (TOI) with new content if there is change in the new service guide delivery descriptor compared to the service guide delivery descriptor.

19. The apparatus of claim 18, wherein the memory includes computer-executable instructions configured to enable the apparatus to read the container if the container includes at least one missing fragment.

20. The apparatus of claim 18, further comprising a receiver connected to the processor, wherein the receiver comprises a Digital Video Broadcasting-Handheld receiver.

21. The apparatus of claim 18, further comprising a receiver connected to the processor, wherein the receiver comprises at least one of the receivers selected from the list of a WLAN receiver, a FM Radio receiver, and a telecom receiver.

22. The apparatus of claim 18 wherein the at least one service guide delivery descriptor provides a complete list of one or more fragments needed from the service guide delivery session.

23. The apparatus of claim 18 wherein the memory includes computer-executable instructions configured to prevent the apparatus from listening to the service guide delivery session once all missing fragments declared by the service guide delivery descriptor are received.

* * * * *